(12) United States Patent
Greer et al.

(10) Patent No.: US 10,948,985 B2
(45) Date of Patent: Mar. 16, 2021

(54) RETINA SPACE DISPLAY STABILIZATION AND A FOVEATED DISPLAY FOR AUGMENTED REALITY

(71) Applicant: NVIDIA Corporation, Santa Clara, CA (US)

(72) Inventors: Thomas Hastings Greer, Chapel Hill, NC (US); Josef Bo Spjut, Durham, NC (US); David Patrick Luebke, Charlottesville, VA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/365,941

(22) Filed: Mar. 27, 2019

(65) Prior Publication Data

US 2019/0302883 A1 Oct. 3, 2019

Related U.S. Application Data

(60) Provisional application No. 62/648,787, filed on Mar. 27, 2018.

(51) Int. Cl.
*G06F 3/01* (2006.01)
*G06T 1/20* (2006.01)
*H04N 13/332* (2018.01)
*H04N 13/383* (2018.01)

(52) U.S. Cl.
CPC .............. *G06F 3/013* (2013.01); *G06F 3/012* (2013.01); *G06T 1/20* (2013.01); *H04N 13/332* (2018.05); *H04N 13/383* (2018.05)

(58) Field of Classification Search
CPC ....... G06F 3/013; G06F 3/012; H04N 13/383; H04N 13/332; G06T 1/20
USPC ......................................................... 345/633
See application file for complete search history.

(56) References Cited

U.S. PATENT DOCUMENTS

| 9,553,034 | B1 * | 1/2017 | Young ............... G01N 21/9503 |
| 2002/0057238 | A1 * | 5/2002 | Nitta ....................... G09G 3/342 345/87 |
| 2005/0046933 | A1 * | 3/2005 | Luecke .................. A61B 3/132 359/376 |
| 2005/0264502 | A1 * | 12/2005 | Sprague ................... G02B 5/10 345/84 |

(Continued)

*Primary Examiner* — Ke Xiao
*Assistant Examiner* — Kim Thanh T Tran
(74) *Attorney, Agent, or Firm* — Leydig, Voit & Mayer, Ltd.

(57) ABSTRACT

Perceived clarity of an image presented by a display can be improved using an image stabilization technique to stabilize the image relative to a user's retina. During an illumination period, stabilization actuators are controlled to move a display panel or adjust optical components in the path of light associated with the image to shift the location of the image on the user's retina in response to head or eye movement detected by the system. In some embodiments, a display is configured to illuminate an image, and at least one stabilization actuator is configured to stabilize the image in a retina space associated with a user. Changes in the retina space can be detected by one or more sensors configured to detect a head position of the user and/or an orientation of the user's retina. The image is stabilized in retina space using the stabilization actuators.

18 Claims, 15 Drawing Sheets

(56) References Cited

U.S. PATENT DOCUMENTS

| | | | | |
|---|---|---|---|---|
| 2007/0013918 A1* | 1/2007 | Hauger | ............... | A61B 3/1015 |
| | | | | 356/512 |
| 2007/0080951 A1* | 4/2007 | Maruyama | ........... | G06F 1/1626 |
| | | | | 345/173 |
| 2012/0008055 A1* | 1/2012 | Chen | .................. | G02B 27/2214 |
| | | | | 349/15 |
| 2012/0293548 A1* | 11/2012 | Perez | ...................... | G06F 3/012 |
| | | | | 345/633 |
| 2015/0212576 A1* | 7/2015 | Ambrus | ................. | G06F 3/013 |
| | | | | 345/156 |
| 2015/0379772 A1* | 12/2015 | Hoffman | ............... | G06T 19/006 |
| | | | | 345/633 |
| 2016/0012291 A1* | 1/2016 | Cleland | ............... | A61B 3/1233 |
| | | | | 382/117 |
| 2017/0315367 A1* | 11/2017 | Maruyama | ......... | G02B 27/0172 |
| 2017/0360295 A1* | 12/2017 | Oz | ...................... | G06K 9/3233 |

* cited by examiner

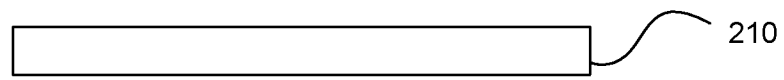
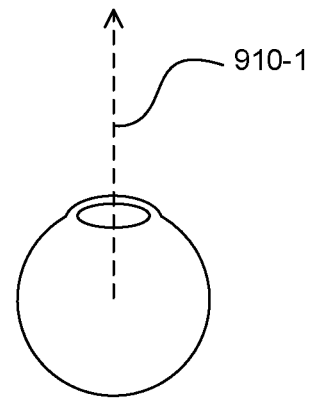
*Fig. 9A*
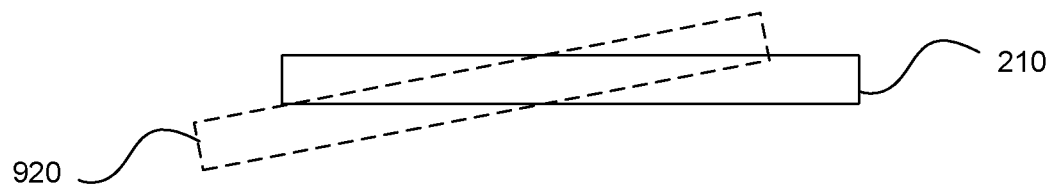
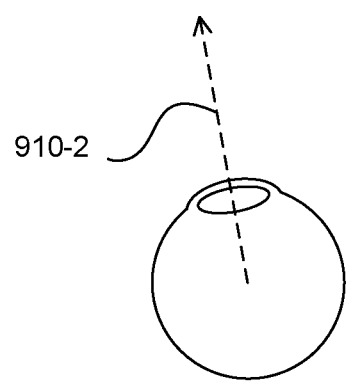
*Fig. 9B*

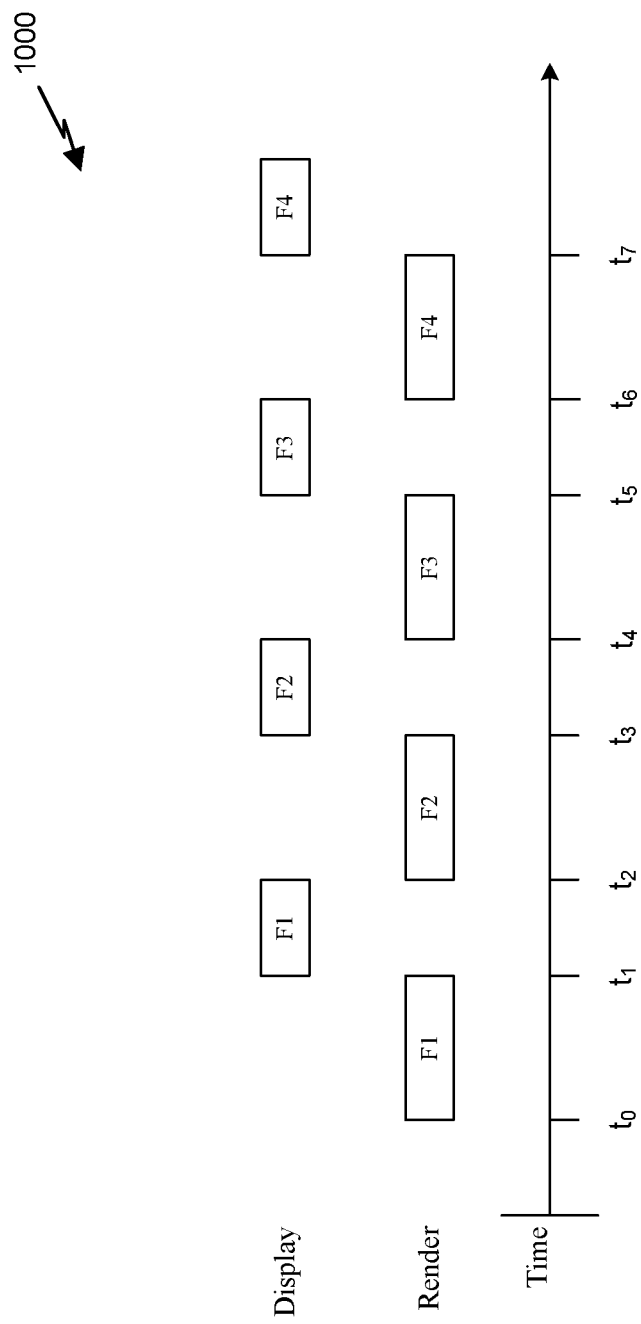

RETINA SPACE DISPLAY STABILIZATION AND A FOVEATED DISPLAY FOR AUGMENTED REALITY

CROSS-REFERENCE TO RELATED APPLICATIONS

This application claims the benefit of U.S. Provisional Application No. 62/648,787 titled "Retina Space Display Stabilization and a Foveated Display for Augmented Reality", filed Mar. 27, 2018, the entire contents of which is incorporated herein by reference.

TECHNICAL FIELD

The present disclosure relates to display systems. More specifically, the present disclosure relates to an apparatus for stabilizing display panels relative to a retina space of a user.

BACKGROUND

Head-mounted displays are commonly used with virtual reality or augmented reality systems. When the display panel is attached to the head of a user, the display panel is forced to move with the head motion of the user. However, the display panel is not necessarily stable with respect to a retina space of the user because the eyes move independently from the head. In particular, a biological process referred to as vestibulo-occular-reflex (VOR) moves the eyeballs automatically in response to signals from the vestibular system (e.g., inner ear). When the images on the display panel move with respect to the user's retina, the images can be blurred. Trying to compensate for the measured head and/or eye movement in virtual reality/augmented reality systems is a major challenge.

Conventional solutions to this problem include increasing the refresh rate of the display panel and shifting the location of image frames on the display, increasing the frame rate of the image rendering pipeline, decreasing the persistence of the display (e.g., periodically illuminating the backlight such that pixels are visible for a smaller percentage of each frame display period), and introducing changes in the rendering pipeline based on the motion of the image in the user's retina space to compensate for the negative effects. However, each of these solutions has drawbacks. For example, the amount of compensation may be limited when displaying a previously rendered image frame in a new location on the display panel (e.g., moving more than a few pixels can be easily detected as the image shifts off the display area). As another example, increasing the frame rate requires a faster image rendering pipeline and increases the required bandwidth between the image rendering pipeline and the display, which can be limited by the physical, thermal, electrical, and algorithmic constraints of the system. As yet another example, decreasing the persistence of the display panel can be limited by the available brightness of the backlight, and driving a higher output for shorter periods of time can decrease the lifetime of electrical components in the display panel. Therefore, there is a need for addressing these issues and/or other issues associated with the prior art.

SUMMARY

A system for stabilizing an image in a retina space associated with a user is presented. In some embodiments, a display is configured to illuminate an image, and at least one stabilization actuator is coupled to the display and configured to stabilize the image in a retina space associated with a user. The system can be activated during an illumination period where the at least one stabilization actuator continuously adjusts the location of the image to compensate for head and/or eye motion detected by the system. In one embodiment, the at least one stabilization actuator is coupled to a display panel and is configured to displace the display panel relative to a frame that encloses the display panel. In another embodiment, the at least one stabilization actuator is coupled to an optical component positioned in a light path of the image and configured to shift the position of the image on an external projection surface. In another embodiment, the at least one stabilization actuator is coupled to an optical component positioned in a light path of the image and configured to shift the position of the image as the image is relayed from the display into the user's eye.

In one embodiment, the system further includes one or more sensors configured to detect a head position of the user. The head position can be utilized to define the retina space of the user. The one or more sensors can include at least one of an inertial measurement unit, a fiducial measurement unit, an optical sensor, or a depth sensor.

In one embodiment, the system further includes a rendering pipeline. The rendering pipeline is configured to generate an image for display based on a first sample of the one or more sensors at a first time. The display is updated to illuminate the image at a second time, subsequent to the first time. The at least one stabilization actuator is activated to stabilize the image in the retina space based on a difference between a second sample of the one or more sensors at the second time and the first sample of the one or more sensors at the first time.

In one embodiment, the system further includes one or more sensors configured to detect an orientation of a retina of the user. The orientation of the retina can be utilized to define the retina space of the user. The one or more sensors can include a gaze tracking system that includes an image sensor for tracking an orientation of the user's eye based on an analysis of a 2D image of the user's eye.

In one embodiment, the system includes an inertial measurement unit configured to detect a head position of the user, and a gaze tracking system configured to detect an orientation of a retina of the user. The head position and the orientation of the retina are utilized to define the retina space of the user.

In one embodiment, the display includes a display panel that is attached to a frame that is fixed in a world space. The frame can be attached or otherwise rest on a horizontal surface such as a desktop, or the frame can be attached to a mounting system to a vertical surface such as a wall.

In one embodiment, the display is included in a head-mounted display unit worn on or otherwise fixed to the head of a user. The head-mounted display unit can be utilized with virtual reality or augmented reality applications.

In one embodiment, the at least one stabilization actuator is activated to stabilize the image in the retina space during an illumination period. In one embodiment, the display exhibits full persistence where the illumination period is equal to a time between two subsequent frames illuminated on the display. In another embodiment, the display exhibits less than full persistence where the illumination period can be less than a time between two subsequent frames illuminated on the display. An off period between illumination periods can be defined where a backlight or light source is deactivated between frames. In one embodiment, the at least one stabilization actuator returns the display to a home position during an off period when a backlight of the display is deactivated.

In one embodiment, the display can implement a rolling shutter mechanism where the illumination period for a first portion of the display is offset from the illumination period for a second portion of the display.

In one embodiment, a method for stabilizing an image in a retina space of a user is presented. The method includes the steps of detecting characteristics of the user at a first time, rendering an image based on the characteristics at the first time, illuminating the image by a display at a second time, detecting characteristics of the user at the second time, and controlling at least one stabilization actuator coupled to the display to stabilize the image in the retina space based on a difference between the characteristics of the user detected at the first time and the characteristics of the user detected at the second time. In one embodiment, the characteristics of the user include a head position of the user. In another embodiment, the characteristics of the user include an orientation of a retina of the user.

In one embodiment, the at least one stabilization actuator is configured to move a display panel of pixel elements relative to a frame of the display. In one embodiment, the at least one stabilization actuator is configured to move an optical component to adjust a position of a projected image on a surface that reflects light from the image towards the user. In one embodiment, the at least one stabilization actuator is configured to move an optical component positioned to redirect light from the display towards the user.

In one embodiment, a head-mounted display unit is presented. The head-mounted display unit includes a display panel including a left portion and a right portion, and at least one stabilization actuator coupled to the display panel and configured to stabilize the image in a retina space associated with a user. The left portion is configured to illuminate a left eye image of a stereoscopic image pair and the right portion is configured to illuminate a right eye image of the stereoscopic image pair.

In one embodiment, a first stabilization actuator is coupled to the left portion of the display panel, and a second stabilization actuator coupled to the right portion of the display panel. The left portion of the display panel can be re-positioned independently from the right portion of the display panel. The left eye image is stabilized according to a left eye retina space that is defined based on an orientation of a left retina of the user and the right eye image is stabilized according to a right eye retina space that is defined based on an orientation of a right retina of the user.

In one embodiment, the head-mounted display unit includes an inertial measurement unit configured to detect a head position of the user, and a gaze tracking system configured to detect the orientation of the left retina of the user and the orientation of the right retina of the user.

In some embodiments, a non-transitory computer readable media is disclosed for storing computer instructions that, when executed by one or more processors, cause the one or more processors to perform image stabilization. The non-transitory computer readable media can comprise a non-volatile memory device.

BRIEF DESCRIPTION OF THE DRAWINGS

FIGS. 9A-9B illustrate eye motion of the user, in accordance with some embodiments.

FIG. 10 illustrates a timing diagram for a sequence of frames illuminated by the display, in accordance with some embodiments.

DETAILED DESCRIPTION

A system is presented that provides for the stabilization of an image within a retina space of the user. While the techniques disclosed can be described in relation to head-mounted displays used for virtual reality or augmented reality applications, the solution is not limited to such displays and can be implemented in traditional displays fixed in world space, such as desktop or wall-mounted displays.

Figure 1:
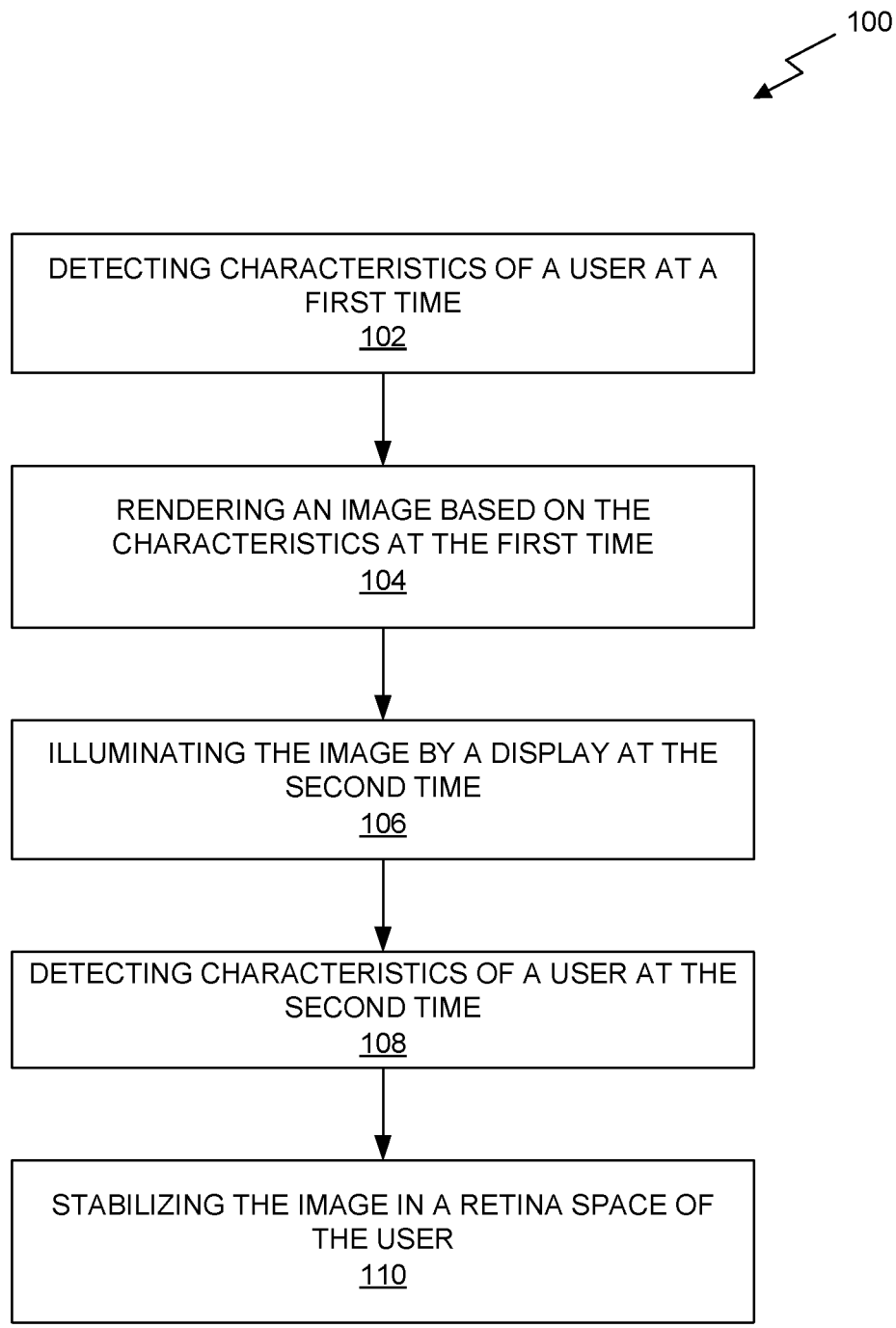
FIG. 1 illustrates a flowchart of a method for stabilizing an image relative to a retina space of a user, in accordance with some embodiments.

In some embodiments, a display is provided with a means of stabilizing the display with respect to a retina space of a user. As shown in FIG. 1, the system includes a display, one or more sensors, a controller, and one or more stabilization actuators. The controller receives input from the one or more sensors and generates output signals to control the stabilization actuator(s). In some embodiments, the stabilization actuator(s) can include encoders or other position sensors that can provide a closed loop feedback about the current position of the display to the controller. In other embodiments, there is no feedback loop and the controller is configured to implement an open loop control system. In some embodiments, the display stabilization system can include multiple displays, each display stabilized independently with separate stabilization actuator(s) and control signals (e.g., dual displays for head-mounted display units).

In one embodiment, the stabilization actuators comprise means for physically moving the location of a display panel relative to the retina(s) of a user. The stabilization actuators can include voice coils, piezoelectric actuators, stepper motors, and the like that convert the output signals to a linear displacement of the display panel. In other embodiments, the stabilization actuators comprise means for re-directing the optical signals produced by the display rather than moving the display panel. The stabilization actuators can include optical components such as lenses, prisms, mirrors, or the like that change the perceived location of the image on a projection surface, or change the path of light projected towards the eye, even though the physical display panel or projector remains fixed in world space or fixed relative to a user's head. Piezoelectric actuators or other types of actuators can be used to move the optical components similar to actuators coupled directly to the display panel.

In some embodiments, the sensor(s) can include inertial measurement units that include accelerometer(s), gyroscope(s), magnetometer(s), optical sensor(s) and the like in one or more axes. In some embodiments, the sensor(s) can include eye tracker technology (e.g., image sensors, eye contact sensors, or electrooculograms (EOG), etc.) that track the point of gaze, convergence, or other parameters related to the state or orientation of a user's eyes relative to head position or world space.

In conventional systems, a position of the display is tracked in world space using, e.g., inertial measurement units. The position is sampled at a first time and an image is generated for display by a rendering system. The image is stored in memory and ready to be displayed on the device at a second time that is delayed, relative to the first time, by a rendering time. In the intervening period between the first time and the second time the display could continue to move, meaning the rendered image is stale and does not correctly reflect the current position of the display relative to a world space at the second time. The image is scanned out to the pixels of the display starting at the second time and continuing until a third time, depending on the refresh frequency of the display or the time it takes to update all of the pixels of the display. During the intervening time between the second time and the third time, the display can continue to move. Conventional systems may attempt to correct for the error introduced due to the delay between the first time and the second time by estimating the position of the display at the second time based on the position of the display at the first time, thereby rendering the image based on the estimated position rather than the measured position. The results vary because there is some error in the estimate. However, none of the conventional systems compensate for the motion blur caused by the displayed image moving in retina space while the image is being displayed. Thus, the image can still be blurred due to head or eye motion relative to the display while the image is illuminated by the display between the second time and the third time.

In some embodiments, the image stabilization system is configured to adjust the location of the display panel or the perceived location of the image based on the tracked eye position and/or orientation. The types of eye motion that can be tracked and compensated for include vestibulo-occular-reflex (VOR) motion and smooth pursuit. Other types of eye motion, such as saccades, microsaccades, ocular drift, and tremors may be ignored by the image stabilization system. The control system can analyze the input from the sensors to distinguish between different types of motion and generate a correction for the display position relative to the world space at a much higher frequency than the refresh frequency of the display (e.g., kHz rather than Hz).

In some embodiments, the controller is configured to implement a closed loop feedback based on the position of the display or optical components to adjust the output signals to the stabilization actuators. In other embodiments, the controller is configured to implement an open loop system with calibration to adjust the output signals to the stabilization actuators. In yet other embodiments, the controller implements, at least in part, a neural network model to estimate the output signals for the stabilization actuators based on a feature vector of input signals from the sensors and/or additional input such as temporal state of the system. The controller can be implemented in software executed by a general purpose processor, specialized hardware (e.g., ASIC, FPGA, DSP, etc.), or any combination of software and hardware. In some embodiments, the control system is implemented as a set of instructions configured to be executed by a central processing unit (CPU), parallel processing unit (PPU), or some combination of one or more CPU and/or PPU cores.

In some embodiments, the control algorithm is adapted to interface with a graphics pipeline configured to generate (i.e., render) computer-generated images to be presented on the display. The graphics pipeline can receive signals from the sensor(s) that provide information related to a position and orientation of a virtual camera for generating the images from a particular perspective in world space. The position and orientation can be related to a position and/or orientation of a user's head as well as a state of a user's eye(s). It will be appreciated that rendering an image takes a finite amount of time between when the sensor information is sampled and when the image is ready for display. During this time, the head and/or eye position of the user can change. Therefore, the control algorithm can attempt to correct the state of the display, relative to a retina space of a user, at the time the image is presented on the display to correct for any change in position of the display that occurred during rendering.

In some embodiments, the control algorithm adjusts the position of the image in the retina space continuously, even when the backlight is off in cases where the display exhibits persistence less than full persistence. In other embodiments, the control algorithm adjusts the position of the image in the retina space only while the image is being illuminated by the display, allowing the display to relax (e.g., not react to changes in head position or gaze direction, return to a home position, etc.) between the presentations of sequential image frames. For example, the control algorithm can be active when the backlight is powered and the control algorithm can be inactive when the backlight is not powered. In some embodiments, the control algorithm still actively controls the position of the image in the retina space when the control algorithm is inactive, merely returning the position of the image in the retina space to a home position during the inactive state. In some embodiments, the control algorithm can be activated prior to turning on the backlight to allow the image to be repositioned prior to the backlight illuminating the pixels in the display. The control algorithm can also be deactivated after turning off the backlight and once the position of the image has returned to the home position.

In some embodiments, the control algorithm can combine virtual image stabilization and physical image stabilization techniques. Virtual image stabilization can refer to shifting the rendered image relative to the pixel space of the display. This technique is useful for coarse repositioning of the image in retina space and can be combined with fine repositioning of the image in retina space by the stabilization actuators at a sub-pixel level of granularity. In other words, the image can be shifted on the display to move the image to a particular location index in retina space at integer multiples of pixel to pixel distance of the display and then the physical stabilization actuators can adjust the position of the image by less than the pixel to pixel distance of the display to finely tune the position of the image relative to retina space. This technique can reduce the required motion from the stabilization actuators to match larger displacements caused by fast head or eye motion. It will be appreciated that virtual image stabilization may be performed at a low frequency that matches the refresh frequency of the display, or at higher frequencies, such as once per scanline. However, the physical image stabilization may be capable of compensating for measured displacement at much higher frequencies.

FIG. 1 illustrates a flowchart of a method 100 for stabilizing an image relative to a retina space of a user, in accordance with some embodiments. Although method 100 is described in the context of a controller and/or a processing unit, the method 100 may also be performed by a program, custom circuitry, or by a combination of custom circuitry and a program. For example, the method 100 can be implemented as a set of instructions executed by a CPU (central processing unit), a graphics processing unit (GPU), a microcontroller, a programmable logic controller (PLC), or any processor capable of implementing at least a portion of the control algorithm or the rendering algorithm. Furthermore, persons of ordinary skill in the art will understand that any system that performs method 100 is within the scope and spirit of embodiments of the present disclosure.

At step 102, characteristics of a user are detected at a first time. In some embodiments, the characteristics of a user can include a head position of the user and/or a gaze direction of the user. The gaze direction of the user can be associated with an orientation of a retina of a user in world space or, alternatively, relative to a display. In some embodiments, the gaze direction of the user can be associated with an orientation of the retina of the user's left eye and the orientation of the retina of the user's right eye. In such cases, a retina space for one or both eyes of the user can be defined based on the characteristics of the user at the first time.

At step 104, an image is rendered based on the characteristics of the user at the first time. In some embodiments, the image is rendered by a rendering pipeline that is configured to render the image, at least in part, based on the characteristics of the user at the first time. In one embodiment, a system includes an inertial measurement unit that is configured to measure a position and/or orientation of a display panel in a world space. In one embodiment, the system can include a gaze tracking system that is configured to measure an orientation of a user's eye with respect to the display panel. The relative orientation of the user's eye with respect to the display panel can be referred to as the user's retina space. In other words, a position and/or orientation of the display panel in world space can be translated into a position and/or orientation of the display panel in retina space based on a relative location and orientation of an eye to the display panel.

At step 106, the image is illuminated by the display at a second time, subsequent to the first time. In some embodiments, illumination refers to the activation of a backlight or other light source used to project light forming the image out of the display. In one embodiment, a backlight is activated to project light through a panel of liquid crystal display (LCD) elements and out through a surface of the display. In another embodiment, each pixel element comprises organic light emitting diode (OLED) element that generates light in response to a voltage when activated. In another embodiment, a light source such as a light emitting diode (LED) is activated to project light through a panel of pixel elements in a projector prior to passing through a lens or other optical components to focus the image on an external projection surface. As used herein, the external projection surface can refer to a surface external to the user's eye that reflects light from the optical component towards the eye or can refer to a surface of an internal structure of the eye, where light from the optical component is projected directly into the user's eye.

At step 108, characteristics of the user are detected at the second time. The characteristics of the user at the second time can be used to update the retina space of the user relative to the world space. A difference between the characteristics of the user at the second time and the characteristics of the user at the first time define a difference in the retina space, relative to the world space, between the first time and the second time.

At step 110, the image is stabilized in the retina space of the user. In one embodiment, stabilization of the image is performed by controlling at least one stabilization actuator coupled to a display panel. The position and/or orientation of the display panel can be adjusted to locate the image relative to the retina space at the second time in accordance with a location of the image relative to the retina space as detected at the first time and subsequently used to render the image. In some embodiments, the position of the display panel is actively controlled between a second time and a third time at which point the image is no longer illuminated by the display. The time between the second time and the third time can be referred to as an illumination period.

In one embodiment, stabilization of the image is performed by controlling at least one stabilization actuator coupled to an optical component that can be used to adjust a position of the image projected onto a projection surface or projected directly at the retina of a user. In such embodiments, the stabilization actuators are configured to move the optical components that redirect the light forming the image rather than a display panel that forms the image by filtering the light.

In one embodiment, the display panel is included in a head-mounted display unit, where the display panel is mounted in a frame that rests on or attaches to the user's head via straps or some other mechanism. Head-mounted display units are common in VR or AR applications. In another embodiment, the display panel is a conventional desktop or wall-mounted display panel that is mounted in a frame. However, even though the frame of the display panel is fixed in world space by being placed on a desktop or mounted to the wall, the display panel can move within the frame relative to the world space and can move relative to the retina space of the user when the user's head or eyes move in world space.

In one embodiment, the display panel is coupled to a first stabilization actuator that moves the display panel relative to the frame in a first direction and a second stabilization actuator that moves the display panel relative to the frame in a second direction. The second direction can be orthogonal to the first direction (e.g., horizontal and vertical). It will be appreciated that any combination of stabilization actuators that move the display panel relative to the frame, not limited to orthogonal directions, can be coupled to the display panel. In some embodiments, the stabilization actuators are connected to a controller that generates an output signal that cause the stabilization actuators to displace the display panel relative to the frame. The controller receives an input signal from the one more sensors and determines a displacement vector that represents a difference between the characteristics of the user at the first time and the characteristics of the user at the second time. The controller generates the output signal, based on the displacement vector, to cause the stabilization actuators to reposition the image relative to a retina space of the user.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
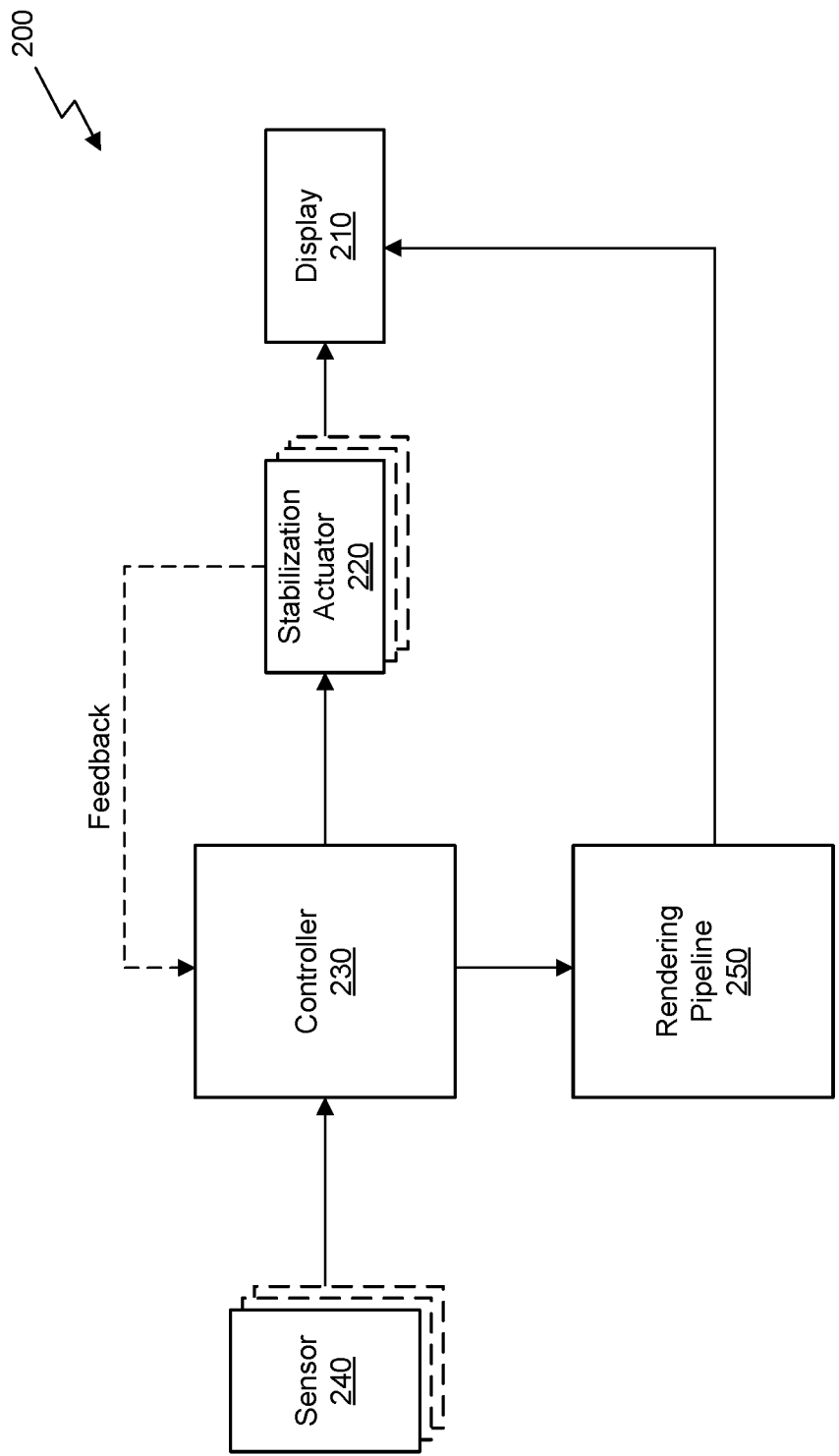
FIG. 2 illustrates a system configured to stabilize an image in the retina space of a user, in accordance with some embodiments.

FIG. 2 illustrates a system 200 configured to stabilize an image in the retina space of a user, in accordance with some embodiments. The system 200 includes a display 210, one or more stabilization actuators 220, a controller 230, one or more sensors 240, and a rendering pipeline 250. In some embodiments, the display 210 includes a liquid crystal display (LCD) panel and a backlight configured to project light through the LCD pixel elements to form the image. In one embodiment, the backlight is activated while the pixel elements are updated, sequentially, such that a starting pixel for an image frame is illuminated at the beginning of an illumination period and scan lines of pixel elements are updated from the top to the bottom of the display 210. In one embodiment, the backlight is deactivated while the pixel elements are updated during an off period and then the backlight is illuminated after all the pixel elements have been updated such that the entire image frame is illuminated simultaneously during the illumination period. In other embodiments, the display 210 is a projector configured to project an image through a lens onto a projection surface located in front of the projector.

In some embodiments, the display 210 includes multiple display panels. For example, in embodiments where the system 200 is related to a head-mounted display unit, the display 210 can include a left display panel associated with a user's left eye and a right display panel associated with the user's right eye. The left display panel is configured to display a left eye image of a stereoscopic image pair and the right display panel is configured to display a right eye image of the stereoscopic image pair. In other embodiments, the display 210 can include a single display panel apportioned into a left portion and a right portion, the left eye image displayed in the left portion and the right eye image displayed in the right portion.

In some embodiments, each stabilization actuator 220 can be implemented as piezoelectric elements, voice coils, linear actuators such as stepper motors and screws, or any other mechanism that translates a signal into a displacement of the image on the retina of a user. In some embodiments, the system 200 includes two stabilization actuators 220 to displace the display panel of the display 210 relative to a frame in a horizontal direction and a vertical direction associated with the pixel elements of the display panel. In some embodiments, the system 200 includes a third stabilization actuator 220 to displace the display panel relative to the frame in a depth direction normal to the display panel. In some embodiments, the system 200 includes three stabilization actuators 220 that rotate the display panel relative to the frame around an x-axis, a y-axis, and a z-axis, respectively, where the x-axis corresponds to the horizontal direction, the y-axis corresponds to the vertical direction, and the z-axis corresponds to the depth direction.

In some embodiments, the three stabilization actuators 220 for rotation can be combined with the two or three additional stabilization actuators for translation. For example, the display panel can be mounted to the frame via a six axis motorized gimbal system. However, it will be appreciated that the more stabilization actuators implemented in the system 200, and the greater the range of translation or rotation provided by each stabilization actuator, the more complex and expensive the system 200 can become. Therefore, some embodiments of the system 200 are limited to a small number (e.g., 1 or 2) of stabilization actuators 220 that provide sufficient repositioning of the display panel in the retina space.

In some embodiments, the controller 230 is configured to receive an input signal and generate an output signal that causes the stabilization actuators to adjust the position of the image in the retina space. In one embodiment, the output signal includes a separate and distinct control signal for each of the stabilization actuators 220. In one embodiment, the stabilization actuators 220 move the display panel within a frame. In another embodiment, the stabilization actuators 220 move optical components that cause the image to move relative to a projection surface. The projection surface can be located in front of the user's retina. Alternatively, the projection surface can include the user's retina. In other words, the image can be projected directly at the user's eye rather than a surface that is visible to the user's eye.

In some embodiments, the controller 230 implements a control algorithm. The control algorithm generates the output signal based on the input signal. In some embodiments, the control algorithm is implemented using open loop control. For example, the control algorithm can model the system 200 and generate the output signal based on the current state of the input signal as well as the prior state of the input signal. In other embodiments, the control algorithm is implemented using closed loop control. In such embodiments, the system 200 can also include encoders or other position sensors that provide a feedback signal to the controller 230 that is used to adjust the position of the image in the retina space. For example, the feedback signal can be utilized with a proportional-integral-derivative (PID) controller to adjust the output signal to correct for error over time and reduce overshoot or undershoot of the system 200. In yet other embodiments, the controller 230 can implement at least a part of the control algorithm using a deep learning neural network. For example, the neural network can be configured to receive a feature vector including the current state of the input signals from the one or more sensors 240 as well as a feedback signal as an input to the neural network and generate the output signals for the one or more stabilization actuators 220.

In some embodiments, the one or more sensors 240 can include an inertial measurement unit. The inertial measurement unit can include gyroscopes, accelerometers, magnetometers, pressure transducers, or the like. Each component included in the inertial measurement unit can provide an input signal to the inertial measurement unit. The inertial measurement unit can combine the input signals from the number of components to generate an output signal that estimates a position of the inertial measurement unit in world space. For example, the inertial measurement unit can include three single-axis accelerometers (or a single multi-axis accelerometer) to measure acceleration along three orthogonal axes. The acceleration signals can be translated into a translation of the inertial measurement unit relative to the world space. Similarly, the inertial measurement unit can include three single-axis gyroscopes (or a single multi-axis gyroscope) that measure rotational velocity around the three orthogonal axes. The rotational velocity signals can be translated into an orientation of the inertial measurement unit in world space. The translation and orientation signals can be integrated over time to estimate a position and/or orientation of the inertial measurement unit relative to a home position and/or home orientation in the world space. The inertial measurement unit can be fixed to the display 210 to estimate the position and/or orientation of the display 210 in world space.

In some embodiments, the one or more sensors 240 include a gaze tracking system. The gaze tracking system is configured to estimate an orientation of one or both of the user's retinas. The orientation of the user's retina can be estimated relative to a position in world space of at least a portion of the gaze tracking system. In one embodiment, the gaze tracking system includes an image sensor that is fixed relative to a frame in which the display 210 is mounted. For example, the image sensor can be included in a frame of a head-mounted display device that is worn on a user's head. The image sensor can be positioned to point towards the expected position of a user's eye in front of the display 210 and configured to capture images of the user's eye. Various algorithms for capturing and analyzing images from the image sensor in order to estimate a gaze direction or orientation of the user's retina are well-known, including using object recognition to estimate the location of a user's iris or pupil within the 2D projection of the user's eye and translating that location into a rotation, in degrees, of the eye in the eye socket. Other algorithms for determining the orientation of the user's retina can incorporate a neural network for analyzing an image of the user's eye and generating an estimate of the orientation of the user's retina.

In some embodiments, the one or more sensors 240 can also include fiducial sensors. Fiducial sensors use optics to identify the position of objects relative to a camera. For example, a sphere of a particular color or an infrared light source can be attached to a device worn by the user. The position of the user's head can then be determined based on analysis of an image captured by an image sensor associated with the display. The one or more sensors 240 can also include other types of optical or depth sensors that are utilized to determine the position and/or orientation of a user's head and/or an orientation of the user's retinas.

In some embodiments, a rendering pipeline 250 is coupled to the display 210 and configured to provide video signals to the display 210. The video signals can provide information for a sequence of image frames in a video sequence. The video signals can be transmitted via an interface such as a High Definition Multimedia Interface (HDMI) or a Digital Video Interface (DVI).

In some embodiments, the rendering pipeline 250 is configured to generate pixel data for display. The pixel data can correspond to a number of pixel elements, such as LCD elements or OLED elements, included in the display 210. For example, the pixel data for a particular image frame can include color values corresponding to each pixel element of the display 210. The video signals can provide the pixel data for a number of horizontal lines of pixel elements of the display 210 (e.g., the vertical resolution), each horizontal line of pixel elements including a number of individual pixel elements of the display 210 (e.g., the horizontal resolution).

In some embodiments, the rendering pipeline 250 receives input from the controller 230. The input can include information that can define the retina space of the user. For example, the position and/or the orientation of the display 210 at a first time can be provided to the controller 230 by the one or more sensors 240. The rendering pipeline 250 is configured to utilize the position and/or the orientation of the display 210 to generate the pixel data. For example, the rendering pipeline 250 can translate the position and/or orientation of the display 210 to adjust a position of a virtual camera, viewport parameters, or any other parameters that result in a different image. In some embodiments, the signals from the sensors 240 can be sampled by the rendering pipeline 250 directly rather than being received from the controller 230.

In some embodiments, the rendering pipeline 250 is implemented, at least in part, as a set of instructions executed by a graphics processing unit (GPU), other parallel processing unit, or specialized set of hardware for generating video signals. In some embodiments, the controller 230 and the rendering pipeline 250 are combined as a single module that renders images and generates output signals for adjusting the position of the image in the retina space of the user. In other embodiments, the controller 230 and the rendering pipeline 250 are implemented via separate integrated circuits or other logic components. A more completion description of an exemplary rendering pipeline, as implemented within a parallel processing unit, is described below.

Parallel Processing Architecture

Figure 3:
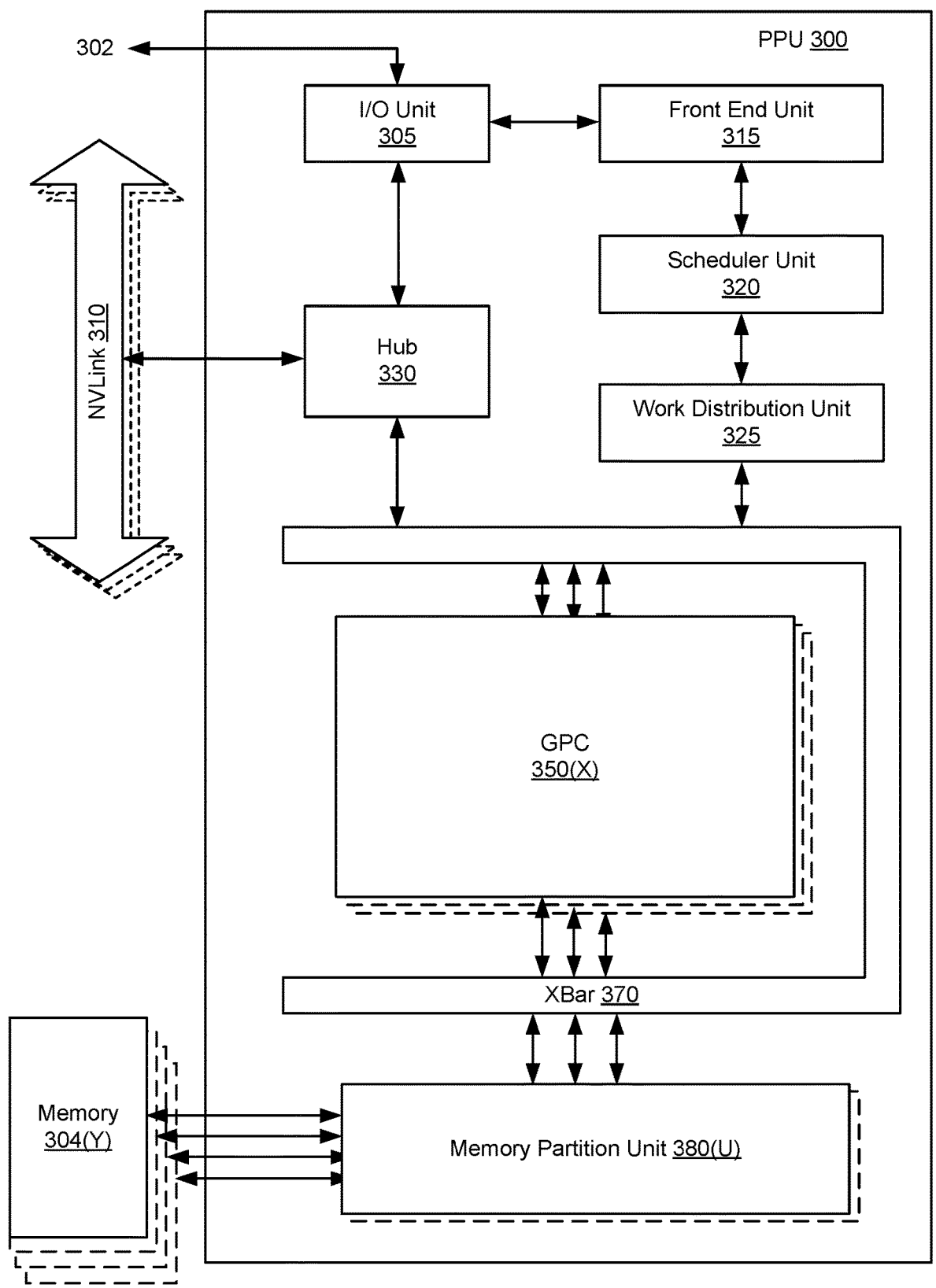
FIG. 3 illustrates a parallel processing unit, in accordance with an embodiment.

FIG. 3 illustrates a parallel processing unit (PPU) 300, in accordance with some embodiments. The PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including: autonomous vehicle platforms; deep learning; high-accuracy speech, image, and text recognition systems; intelligent video analytics; molecular simulations; drug discovery; disease diagnosis; weather forecasting; big data analytics; astronomy; molecular dynamics simulation; financial modeling; robotics; factory automation; real-time language translation; online search optimizations; personalized user recommendations; and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnects. The PPU 300 may also be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units (not explicitly shown) of the PPU 300 such as one or more copy engines, a video encoder, a video decoder, a power management unit, etc. The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units (not explicitly shown) of the PPU 300 such as one or more copy engines, a video encoder, a video decoder, a power management unit, etc. In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
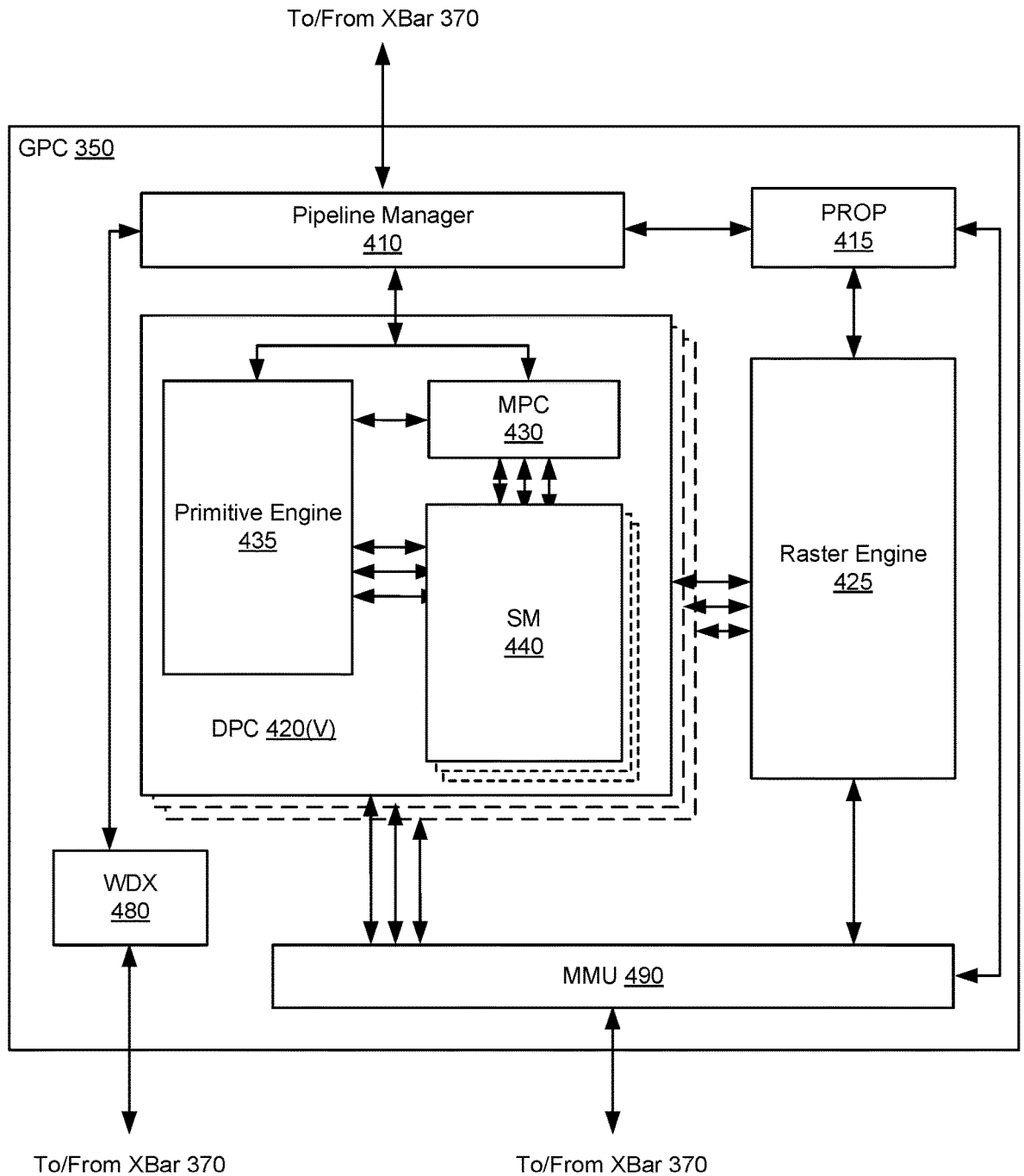
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425, while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
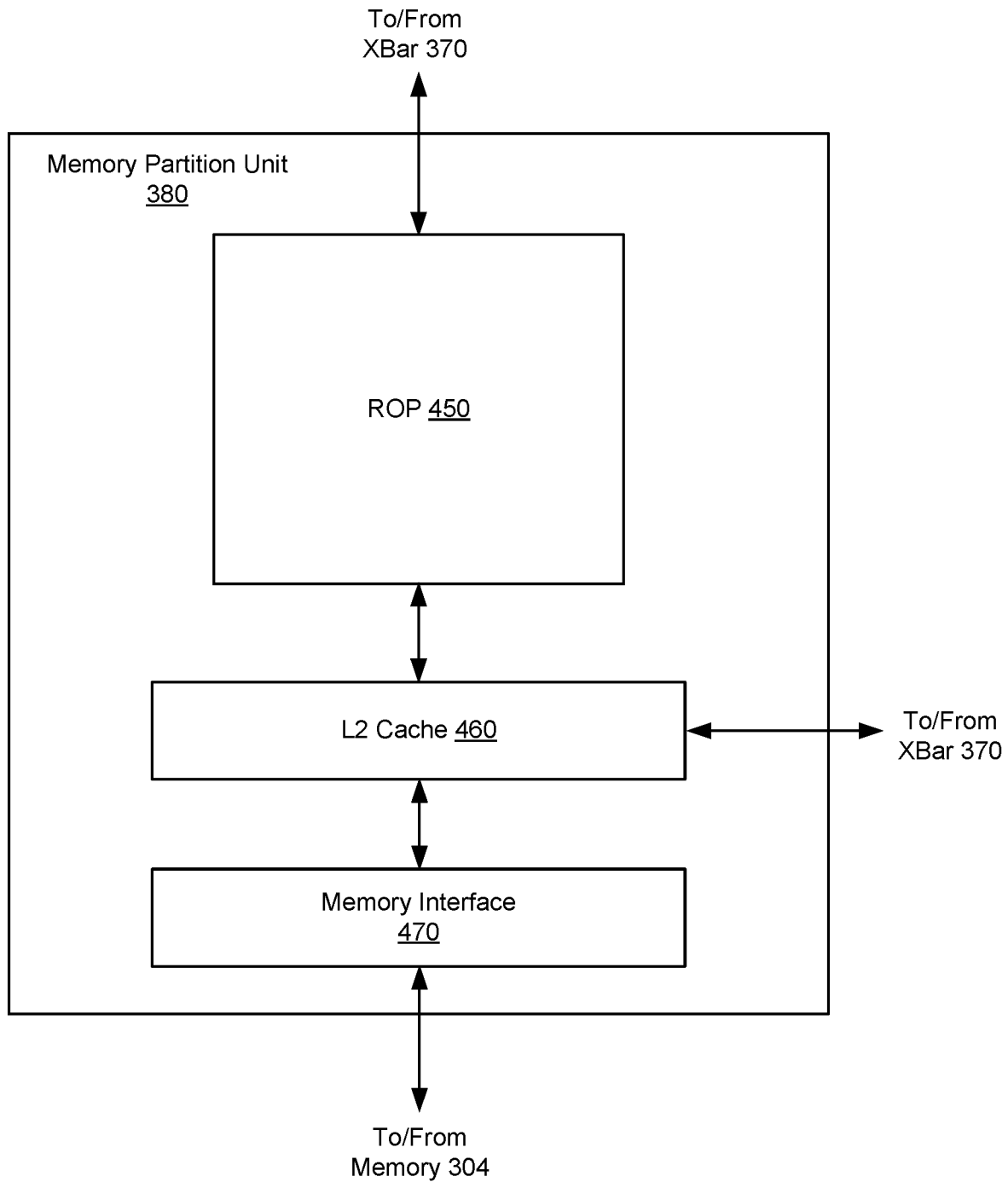
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32-bit, 64-bit, 128-bit, 1024-bit data buses, or the like, for high-speed data transfer. In an embodiment, the PPU 300 incorporates one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In some embodiments, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment, the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In some embodiments, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
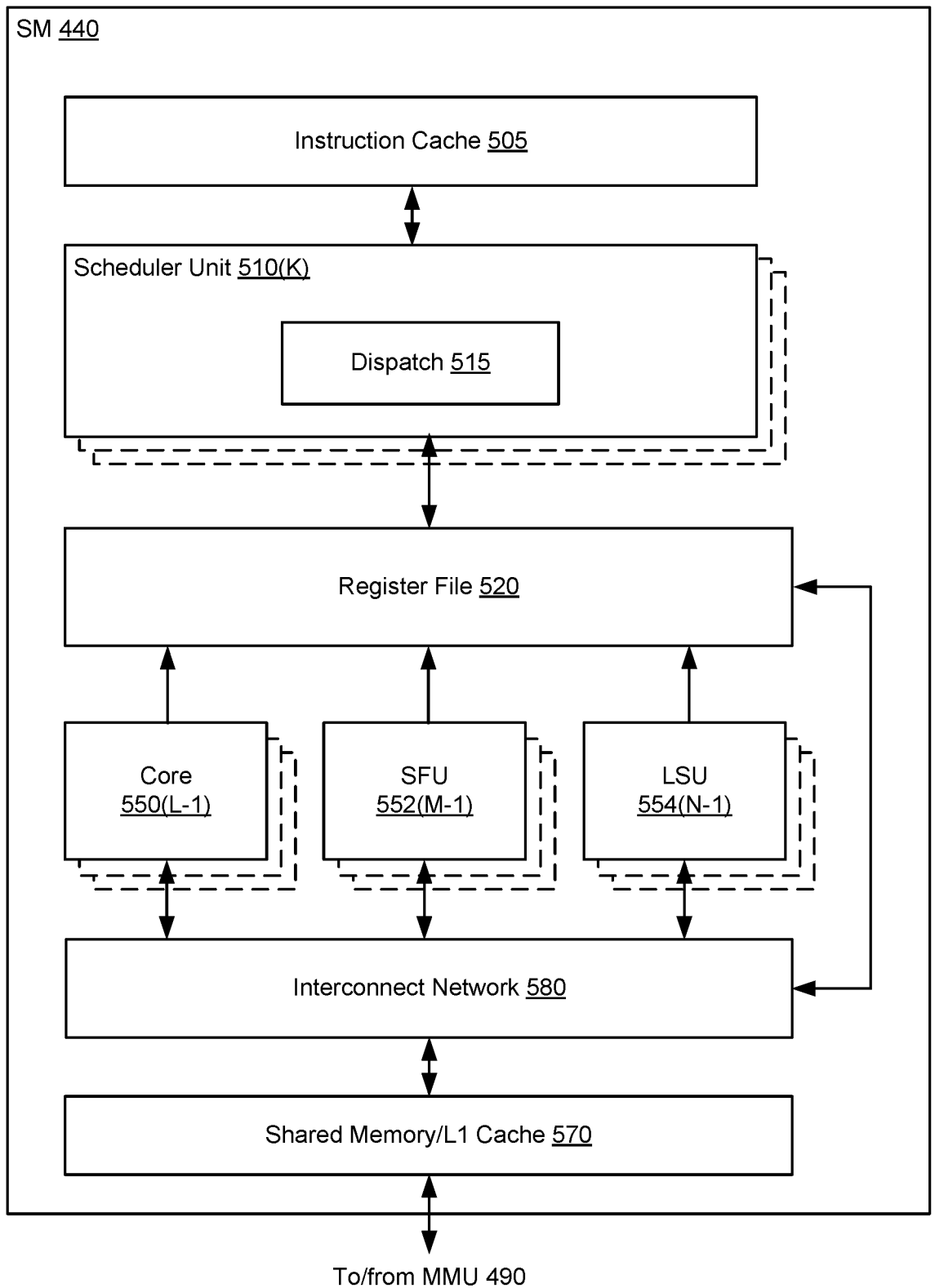
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, and a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores are configured to perform matrix operations, and, in some embodiments, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as the CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In some embodiments, the SFUs 552 may include one or more texture units configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 as well as between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity as a cache. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, using the shared memory/L1 cache 570 to communicate between threads, and using the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
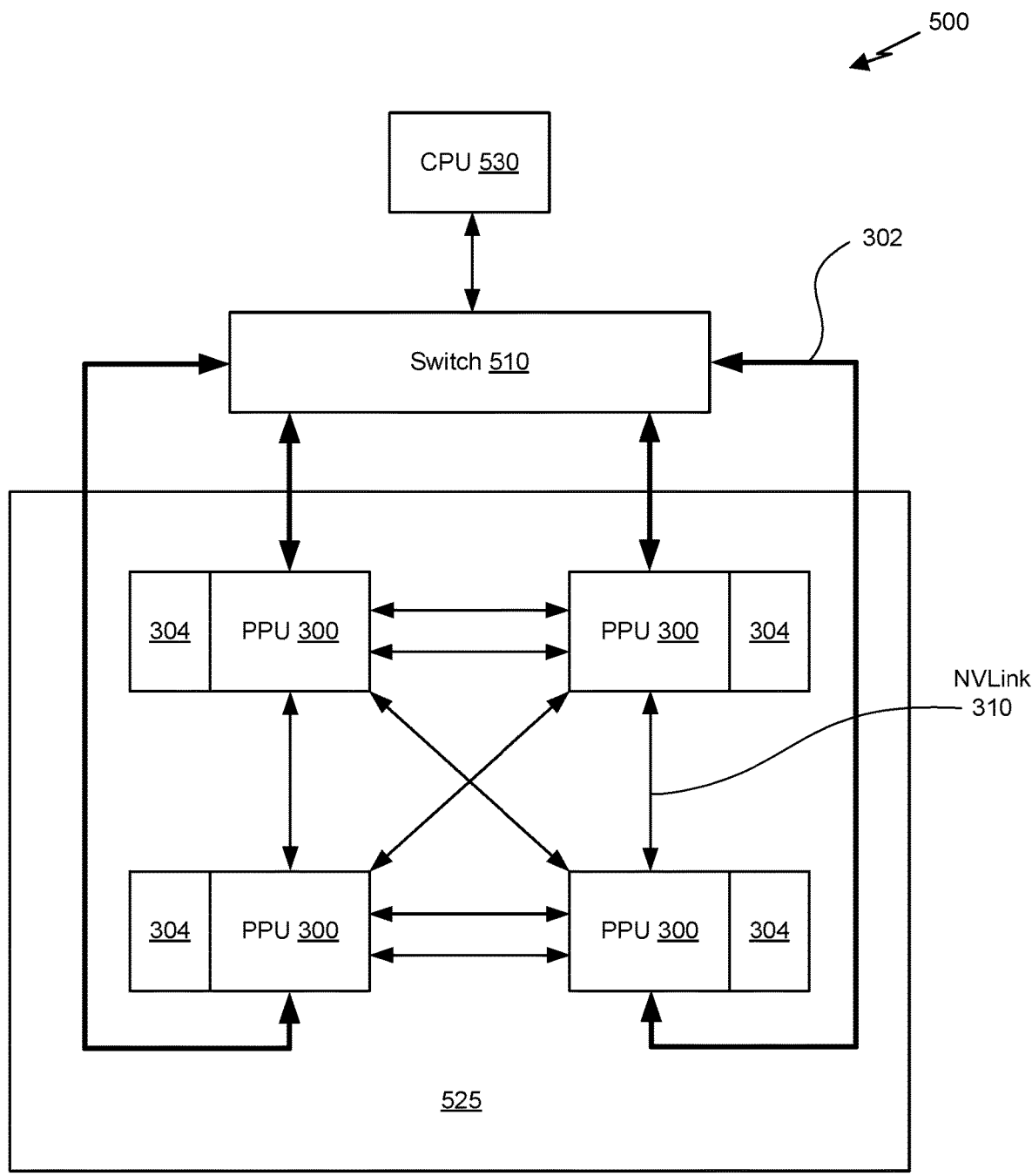
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, a switch 510, and multiple PPUs 300 each coupled to respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
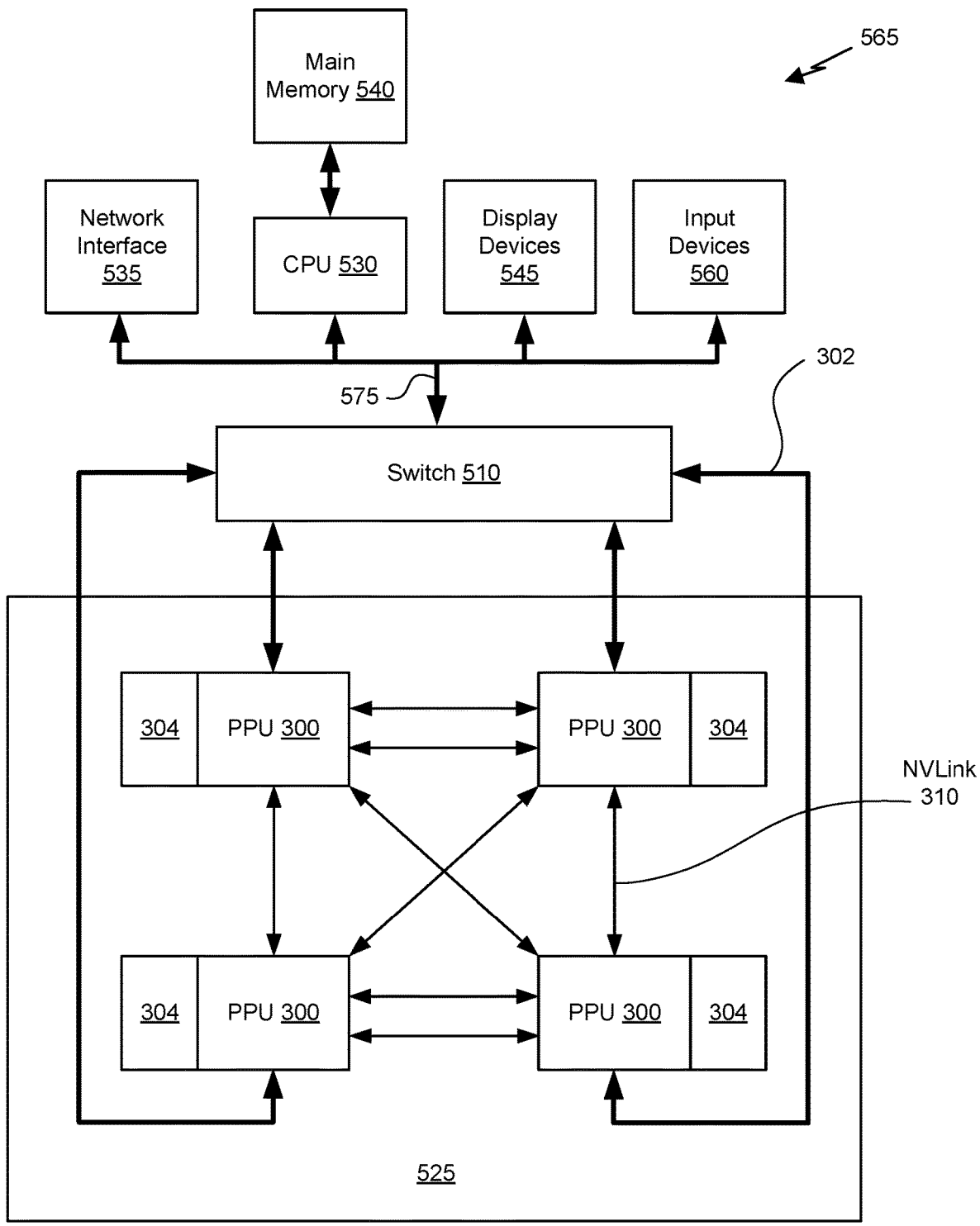
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, or universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
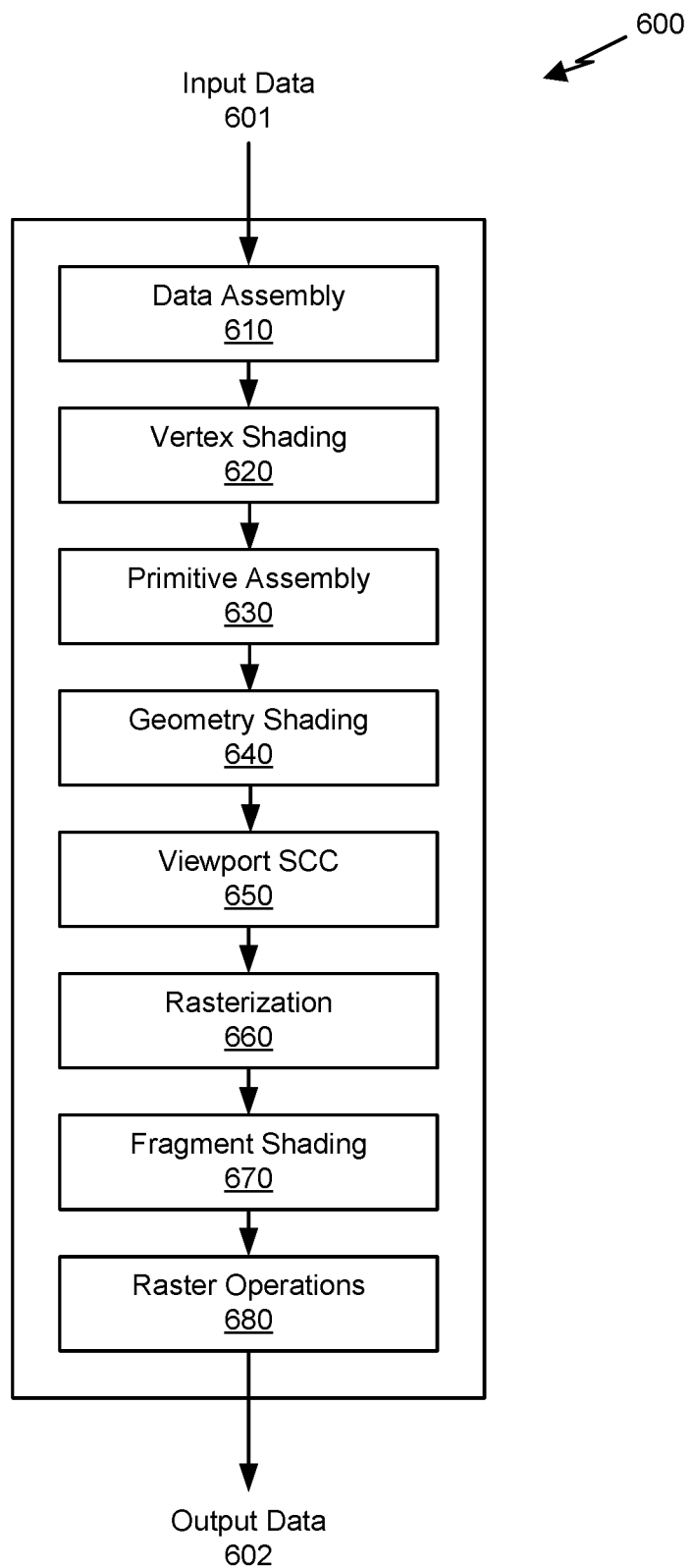
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

In one embodiment, the controller 230 can be configured to utilize a deep learning neural network to control the stabilization actuators and, therefore, adjust the position and/or orientation of the display 210 in order to stabilize the image in the retina space of the user. The input to the neural network can include, for example, sensor feedback related to a head position of the user (e.g., inertial measurement unit data) and orientation of the user's retina (e.g., an image of the user's eye or eyes), encoder feedback specifying the position and/or orientation of the display 210 or stabilization actuators 220, and the like. The input to the neural network can include such data over a window in time, such as for a number of milliseconds or any other length of time that is useful for estimating system dynamics. The output of the neural network provides the control signals for the one or more stabilization actuators.

It will be appreciated that the effectiveness of utilizing a neural network in a control system can be limited by the response time of the neural network. Neural networks can sometimes be very complex, containing many interconnected layers and involving a very large number of computations. These complications take time to perform on the PPU 300, for example, and lead to a delay between receiving the input and adjusting the output. Consequently, care may be necessary to speed up the response time of the neural network by reducing the complexity of the neural network. In some embodiments, the neural network may be included in the control system along with other traditional components of a control system. For example, a neural network may be deployed to estimate gaze direction based on an image of the user's eye, and the output of the neural network can be provided as a parameter of a conventional open-loop or closed-loop control algorithm.

Display Stabilization

As discussed above, improved visual clarity can be achieved in a display system where the image illuminated by the display system is stabilized relative to a retina space of a user. By moving either the display panel or an optical component placed in the path of the light produced by a display to change the location of the image as projected onto a retina of a user, the system can stabilize the image on the retina for a period of time, thereby compensating for motion of the user's head and/or a change in orientation of the user's eyes during that period of time. This stabilization mechanism can help improve the clarity of an image by reducing motion blur associated with VOR or smooth pursuit eye motion. This stabilization technique can significantly improve the viewing experience of head-mounted display units utilized in AR or VR applications.

Figure 7:
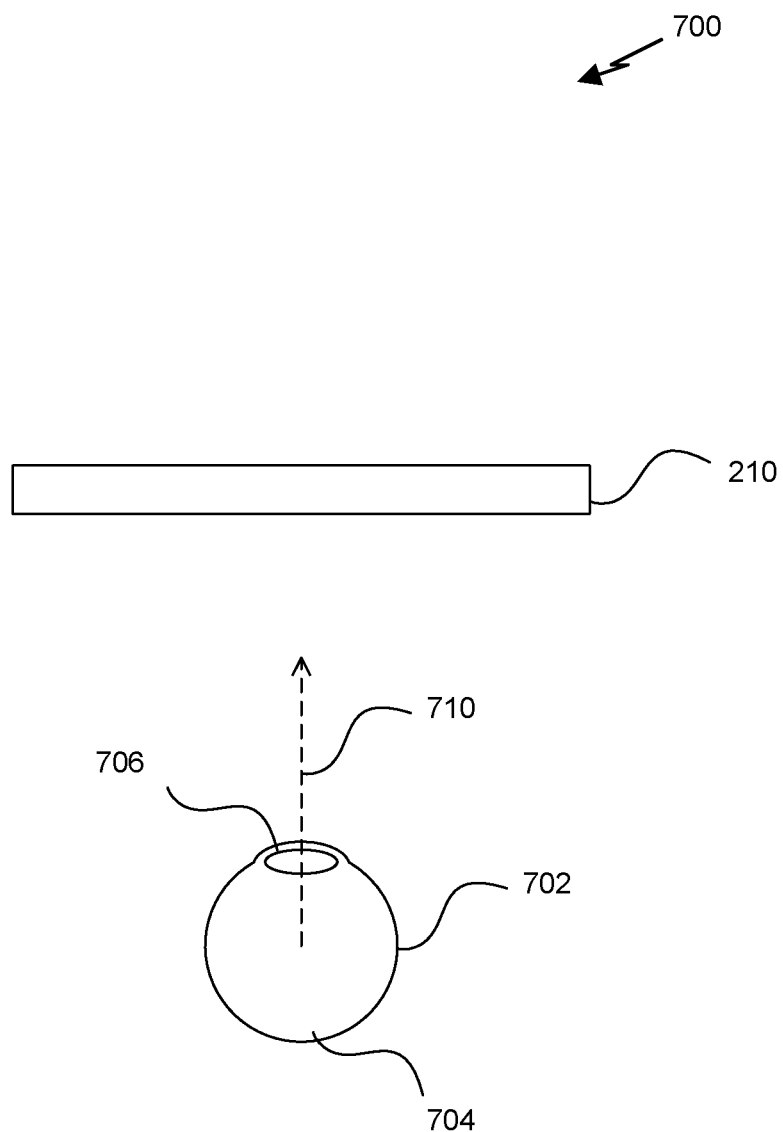
FIG. 7 illustrates a relationship between a user's retina and a display, in accordance with some embodiments.

FIG. 7 illustrates a relationship between a user's retina 704 and a display 210, in accordance with some embodiments. As depicted in FIG. 7, a system 700 includes the display 210 of system 200, as viewed from a top view. The display 210 is positioned in front of a user's eye 702. For example, the system 700 can be included in a head-mounted display unit. Alternatively, the display 210 can be mounted to a wall or positioned on a desktop in front of the user.

As is well-known, an eye 702 can include structures such as the retina 704 and a lens 706. Additional structures, such as an iris, a cornea, or a fovea (as a portion of the retina 704), are not shown in FIG. 7 to avoid obscuring the invention. Light entering the eye 702, through a pupil formed by the iris, passes through the lens 706 and is focused on the retina 704 (or approximate thereto). The arrangement of the retina 704 and lens 706, at least in part, defines an orientation 710 of the eye 702. As used herein, the orientation of the eye 702 can refer generally to the orientation of the retina 704, a position and orientation of the eye 702, a gaze direction, or a gaze orientation. In general, these terms can refer to a line of sight for the eye that passes through a center of the retina and a focal point of the lens 706.

Although not shown explicitly, a user or viewer of a display 210 may view the display 210 with two eyes. In such cases, the gaze direction can be tracked for one of the two eyes and the gaze direction for the other eye is ignored. The particular eye being tracked can be the dominant eye, which can be specified as a configuration setting of the system 700 or selected automatically by the system 700 (e.g., randomly, pseudo randomly, always as the left eye, always as the right eye, etc.). Alternatively, the gaze direction for each eye can be tracked independently and a gaze direction vector specifying gaze directions for both eyes can be utilized by the system 700.

It will also be appreciated that the position of the eye 702 relative to a position of the display 210 is not fixed. For example, the eye 702 is not located a fixed distance from the display 210 or the eye 702 is not fixed on a central axis of the display 210.

The retina space of the user can be defined based on the position of the user's head (i.e., head position) and the orientation 710 of the eye 702 relative to the head position. The position of the eye 702 can be related to the position and/or orientation of the user's head. Furthermore, the orientation 710 of the eye 702 can also refer to the orientation of the user's retina.

Figure 8:
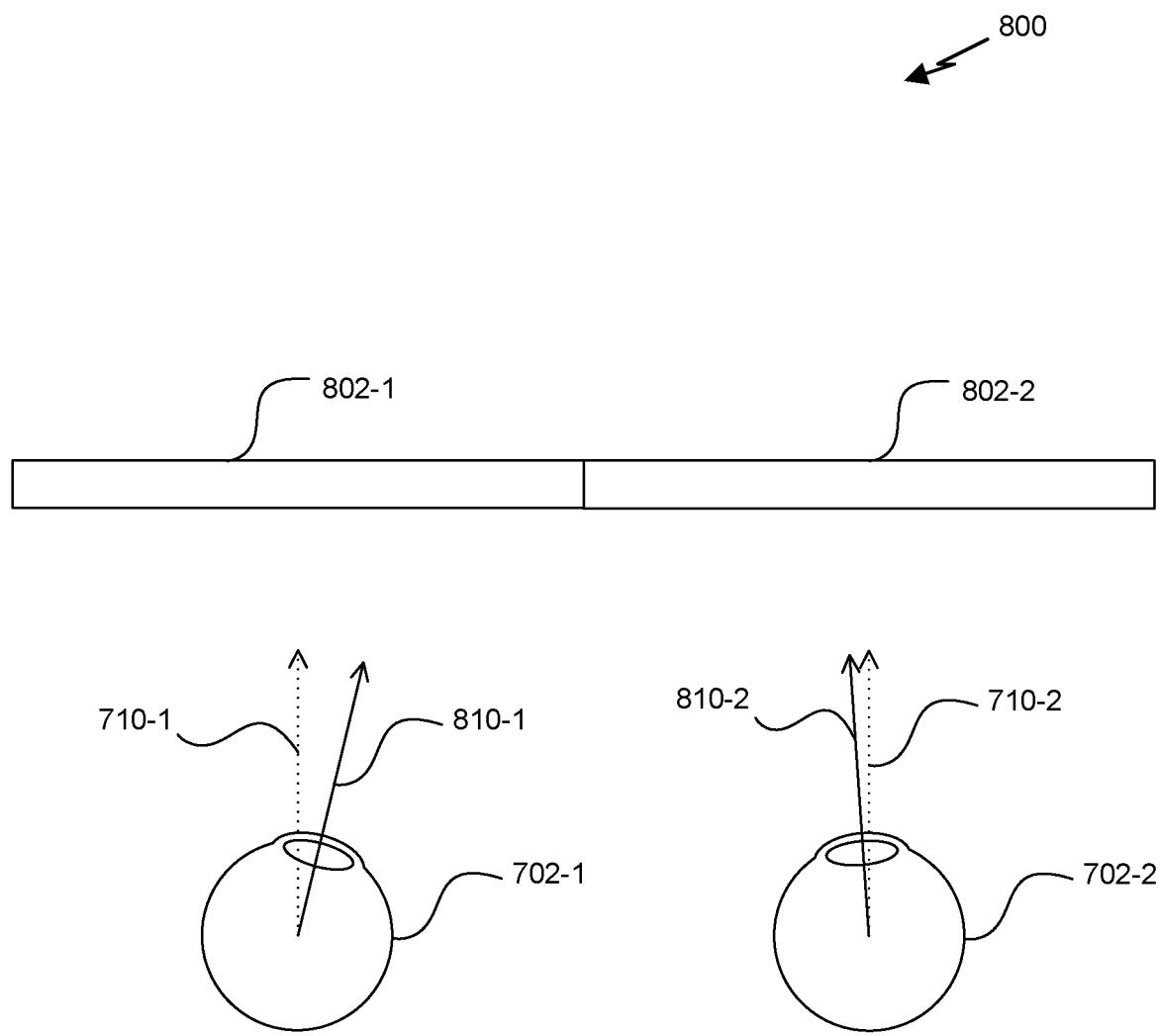
FIG. 8 illustrates a head-mounted display unit that includes two display panels, in accordance with some embodiments.

FIG. 8 illustrates a head-mounted display unit 800 that includes two display panels 802, in accordance with some embodiments. The head-mounted display unit 800 can include a left display panel 802-1 and a right display panel 802-2. A left eye 702-1 is positioned in front of the left display panel 802-1 and a right eye 702-2 is positioned in front of the right display panel 802-2. With the eyes 702-1, 702-2 relaxed and focused straight ahead at infinite convergence distance, the left eye 702-1 is associated with orientation 710-1 and the right eye 702-2 is associated with orientation 710-2. However, when focusing on an object, the eyes will converge on the object, meaning the orientation 810-1 of the left eye 702-1 diverges from the orientation 810-2 of the right eye 702-2.

In some embodiments, the left eye image associated with the left display panel 802-1 is stabilized based on the orientation 810-1 of the left eye 702-1, and the right eye image associated with the right display panel 802-2 is stabilized, independently, based on the orientation 810-2 of the right eye 702-2. In one embodiment, the left display panel 802-1 can be re-positioned by a first set of stabilization actuators independently from the right display panel 802-2, which is re-positioned by a second set of stabilization actuators.

In other embodiments, the head mounted display unit 800 includes a single display panel including a left portion 802-1 and a right portion 802-2 and is configured to display a left eye image and a right eye image simultaneously. The left portion 802-1 of the display can be occluded from the view of the right eye 702-2, and the right portion 802-2 of the display can be occluded from the view of the left eye 702-1, such as by a physical structure of plastic, rubber, or other material placed adjacent the display between the left portion 802-1 and the right portion 802-2 and extending towards the user's face between the left eye 702-1 and the right eye 702-2. In such embodiments, the left eye image is stabilized based on the orientation 810-1 of the left eye 702-1, and the right eye image is stabilized based on the orientation 810-2 of the right eye 702-2.

FIGS. 9A-9B illustrate eye motion of the user, in accordance with some embodiments. As is well-known, the eye 702 can move independently from the head or body of the user. The user's eye 702 can have a first orientation 910-1 at a first point in time. In some embodiments, the first orientation 910-1 can be parameterized as a two component vector. For example, a first component of the two component vector can represent an offset angle, in a horizontal direction, relative to a normal vector from the eye 702 to the display 210, and a second component of the two component vector can represent an offset angle, in a vertical direction, relative to the normal vector. The first component can be referred to as yaw and the second component can be referred to as pitch. Alternatively, the components can be referred to as an azimuth angle and a polar angle in a spherical coordinate system, with <0,0> representing the normal vector and positive and negative angles representing left and right rotation directions and up and down rotation directions, respectively, from the normal vector.

In other embodiments, the orientation 910-1 can be parameterized using other means for differentiating between different gaze directions, such as by assigning specific indexes to pre-determined orientation values, and using a neural network to classify an image of the eye 702 according to the indices. It will be appreciated that the gaze direction should have sufficient resolution, if parameterized in this manner, to capture small eye motion differences. In other words, the number of different indices associated with different pre-determined orientation values should be large enough to distinguish between small changes in the orientation of the eye 702.

As the eye 702 rotates away from center to a rotated position looking to the left side of the display 210, associated with orientation 910-2, the image illuminated by the display can be viewed as changing in position and orientation relative to the retina 704 of the eye 702. A space can be defined, referred to as retina space, in which every object in a world space has a corresponding position in retina space that is relative to the position and/or orientation of the retina 704 in world space. An affine transformation, T, can also be defined that represents a transformation from world space to retina space.

For example, as depicted in FIG. 9B, where the position of the eye 702 remains fixed relative to the display 210, but the orientation of the eye 702 changes from a first orientation 910-1 at a first time to a second orientation 910-2 at a second time, the position and orientation of the display 210 relative to the retina 704 of the eye 702 changes in the retina space. For example, a position and orientation of the display 210 is shown at location 920 as if the display 210 was fixed in retina space during the eye motion from the first time to the second time. The difference in the position of the display 210 in retina space over the period of eye motion is obvious. It will be appreciated that the eye motion, in retina space, will cause light emitted from specific pixel elements of the display panel to move across different structures in the retina over the period of the eye motion, resulting in a blurring or a decrease in spatial resolution of the image perceived by the retina.

Consequently, display stabilization in retina space involves the steps of detecting a gaze direction of a user (e.g., an orientation of a user's eye 702 or retina 704) and using stabilization actuators to either change the location of the display 210 projecting an image onto the user's retina 704 from a new location in world space or change the projected direction of light produced by the display as it enters the user's eye, thereby changing the projected location of the image on the user's retina 704. For example, as the user's gaze changes from the first orientation 910-1 to the second orientation 910-2, the display 210 would change the location 920, thereby stabilizing the image perceived by the user.

Various types of eye movements can be corrected by the display stabilization technique disclosed herein to decrease blurriness or increase spatial resolution of the perceived image by tracking the gaze direction of the user while each image is displayed and moving the display panel to track the gaze direction in an attempt to fix the location of the display panel in the retina space of the user. There are four basic types of eye motion addressed here: saccades, smooth pursuit, vergence, and vestibulo-occular-reflex (VOR).

A saccade is defined as a rapid movement of the eyes that changes the fixation point abruptly. Saccades allow a viewer to focus on different areas of a scene, or different portions of an image displayed on the display 210, by projecting light from different areas of the scene onto the fovea, which has higher spatial resolution than the rest of the retina. During a saccade, certain visual system attenuation occurs masking some frequencies of the perceived image. A subset of saccades having small angular displacements, such as less than 120 arcminutes, can be referred to as microsaccades.

Smooth pursuit movements are consistent with slower movements from one fixation point to another fixation point to track a moving object. In other words, the projection of the object being tracked is focused on the fovea during the smooth pursuit movement rather than the projection of the object moving off the fovea while the fixation point remains fixed and then moving back onto the fovea due to a saccade at a later point in time. Smooth pursuit motion is voluntary while saccades can be voluntary or involuntary.

Vergence movements can be defined as movements to align the foveas of the left eye and the right eye with fixation targets located at different distances from the eyes. More specifically, because the eyes are spread at an interocular distance of approximately 6-7 cm, also referred to as interpupillary distance, the eyes need to converge or diverge to focus an image of an object on both foveas of the user's eyes. As the fixation point moves to objects at different depths, the convergence of the eyes changes.

Vestibulo-occular-reflex (VOR) motion refers to automatic eye movements in response to signals from the vestibular system (e.g., inner ear) that attempt to stabilize the eyes relative to the external world, thereby compensating, at least partially, for head movement. For example, if your head drifts or rotates left, the brain will automatically rotate your eyes right to attempt to keep the image projected on the retina stable. However, if the display 210 moves in concert with the user's head, such as in a head-mounted display unit, then the VOR motion can actually worsen the perceived motion blur of the image causing swimming of the image in the user's field of view.

FIG. 10 illustrates a timing diagram for a sequence of frames illuminated by the display 210, in accordance with some embodiments. As depicted in FIG. 10, a first frame, F1, is rendered by a rendering pipeline 250 at a first time, $t_0$. In one embodiment, the rendering pipeline 250 can implement, at least in part, the graphics processing pipeline 600. In one embodiment, the rendering pipeline 250 receives a first sample from the one or more sensors 240 at the first time $t_0$ and renders the first frame F1 based on the first sample. For example, the first sample can provide a head position of a user and/or an orientation of a retina of the user, which can be used to determine an orientation of a viewing frustum or viewport configured by the rendering pipeline to generate the first frame F1. In the case of a head-mounted display unit, the head position of the user can determine how a scene is rendered by adjusting one or more parameters of the rendering pipeline such that the image being displayed is matched to a position and/or an orientation of the user's head in world space.

The rendering pipeline 250 finishes rendering the first frame F1 at a second time, $t_1$, at which point the image data for the first frame is scanned out via a video signal to update the display 210. The display 210 illuminates the image for a period of time, referred to as an illumination period, between time $t_1$ and time $t_2$. A second frame, F2, is rendered by the rendering pipeline 250 at a third time, $t_2$, based on a second sample from the one or more sensors 240 at the third time $t_2$. The rendering pipeline 250 finishes rendering the second frame at a fourth time, $t_3$, at which point the image data for the second frame F2 is scanned out via a video signal to update the display 210. The display 210 illuminates the image for the second frame F2 for a period of time between time $t_3$ and time t4. The rendering and display of subsequent frames F3 and F4 are performed in similar fashion.

In some embodiments, as depicted in FIG. 10, the display 210 exhibits a persistence that is less than full persistence. Persistence refers to a percentage of a frame period during which the image is illuminated by the display 210. In other words, the backlight or other illumination means for the display 210 is turned off or deactivated between time $t_0$ and time $t_1$ and turned on or activated between time $t_1$ and time $t_2$ when the display 210 exhibits less than full persistence. In other embodiments, the display 210 can exhibit full persistence where each frame remains illuminated until the subsequent frame is ready to be displayed. For example, the first frame F1 can be illuminated until time $t_3$ rather than time $t_2$. Furthermore, although the second frame F2 is illustrated as being rendered at time $t_2$, rendering of the second frame F2 could begin anytime subsequent to time $t_1$ when the rendering pipeline 250 is idle after finishing rendering of the first frame F1. In other words, in some embodiments, rendering and display are separate and independent processes that can be performed by the hardware in parallel such that display of one frame at least partially overlaps the rendering of a subsequent frame.

It will be appreciated that the display of image frames in a sequence of video takes place over a period of time that is not synchronized with the head motion and/or orientation of the user's eyes. In other words, image frames being displayed correspond with a state of the user's head position and/or an orientation of the user's eyes at a point of time in the past prior to the image frame being rendered. More particularly, the first frame F1 is displayed between time $t_1$ and time $t_2$, but the first frame F1 is rendered based on information collected at or prior to time $t_0$. To help alleviate issues caused by subsequent head or eye motion between time $t_0$ and time $t_2$, the image presented by the display 210 can be stabilized in a retina space of the user.

In some embodiments, each image frame can be defined relative to a retina space of the user. For example, a first sample of the one or more sensors 240 at the first time $t_0$ can be utilized to define the retina space at a time when the first image frame F1 is rendered. The position and/or orientation of the display 210 in a world space can be continuously adjusted based on the signals from the one or more sensors 240. Consequently, at time $t_1$ and through time $t_2$, while the first frame F1 is illuminated by the display 210, the controller 230 can control at least one stabilization actuator to move the display 210 in world space to stabilize the image in the retina space of the user. More particularly, the display 210 is re-positioned in world space such that the image for frame F1 remains approximately fixed on the retina of the user as if head motion and/or eye motion was damped between time $t_0$ and $t_2$. The motion is referred to as damped rather than fixed because no stabilization system can react to changes in the retina space instantly. By stabilizing the image with respect to the retina space of the user, the user gains a better visual perception of the image.

In some embodiments, artifacts due to certain types of eye motion between time $t_0$ and time $t_2$ can be corrected. For example, motion blur due to smooth pursuit can be corrected. In smooth pursuit a user's eyes closely track an object moving across the user's field of vision. A gaze tracking system can track the orientation of the user's retina during time $t_0$ to time $t_2$. Because the image is rendered according to a retina space as defined at time $t_0$, the image is stabilized relative to the retina space during at least time $t_1$ to time $t_2$, while the image is illuminated.

In some embodiments, the position and/or orientation of the display 210 or the position and/or orientation of optical components can be returned to a home position during the OFF period in between two adjacent illumination periods. It will be appreciated that the range of the stabilization actuators 220 can be limited and, therefore, the amount of travel of the display 210 or the range of translation of a projected image on a projection surface is also limited. Attempting to continuously track the motion of a user's eye, as in smooth pursuit, can quickly reach the limit of the range of the stabilization actuators 220 unless the display 210 or optical components are intermittently returned to a home position near the center of the range of travel of the stabilization actuators 220. In some embodiments, the home position can be adapted based on the type of eye motion being detected. For example, the home position can be adapted to be close to one extreme of the range of travel of a stabilization actuator in order to extend the range of travel permitted during a particular illumination period to account for fast eye motion.

Smooth pursuit is merely one type of eye motion that can be compensated by the stabilization system. For example, VOR motion can be compensated by stabilizing the image in response to eye motion that corrects, at least partially, for head motion. Again, a biological process tries to compensate for head motion by moving the eyes automatically in an opposite direction to stabilize the image on the retinas. However, when the display position is tied to the head motion, then the image is in motion with the head and the automatic corrective eye motion associated with VOR is actually counterproductive and causes the image to swim in retina space. Consequently, when the one or more sensors detect changes in head position and corresponding changes in gaze direction associate with VOR motion, the at least one stabilization actuator 220 can be used to re-position the display 210 and/or adjust the position and/or orientation of optical components to keep the image stabilized in the retina space.

In some embodiments, the stabilization system can be configured to ignore some types of eye motion. For example, saccades and/or micro-saccades can be ignored by the stabilization system because these types of motion are associated with quick re-focusing on new fixation points. Consequently, blurring of the image during these types of motion is acceptable because the visual system is likely to attenuate certain frequencies in the perception of the image during these motions. Similarly, vergence motions can also be ignored as they represent a change in fixation to an object at different depth within the image and, therefore, some motion blur is expected as the eye moves across the scene.

In some embodiments, the display 210 can be configured to illuminate different portions of an image at different times. This can sometimes be referred to as a rolling shutter. In such embodiments, each portion of the image can be rendered at different times and displayed in sequence on corresponding different portions of the display 210. Each portion of the image is fixed in the retina space according to a sample of the one or more sensors 240 taken at a different time. Consequently, the controller 230 stabilizes the image according to an updated retina space for the different portions of the image. In other words, each portion of the image can be treated as if that portion of the image is a separate frame, rendered based on a corresponding sample of the one or more sensors 240.

Figure 11:
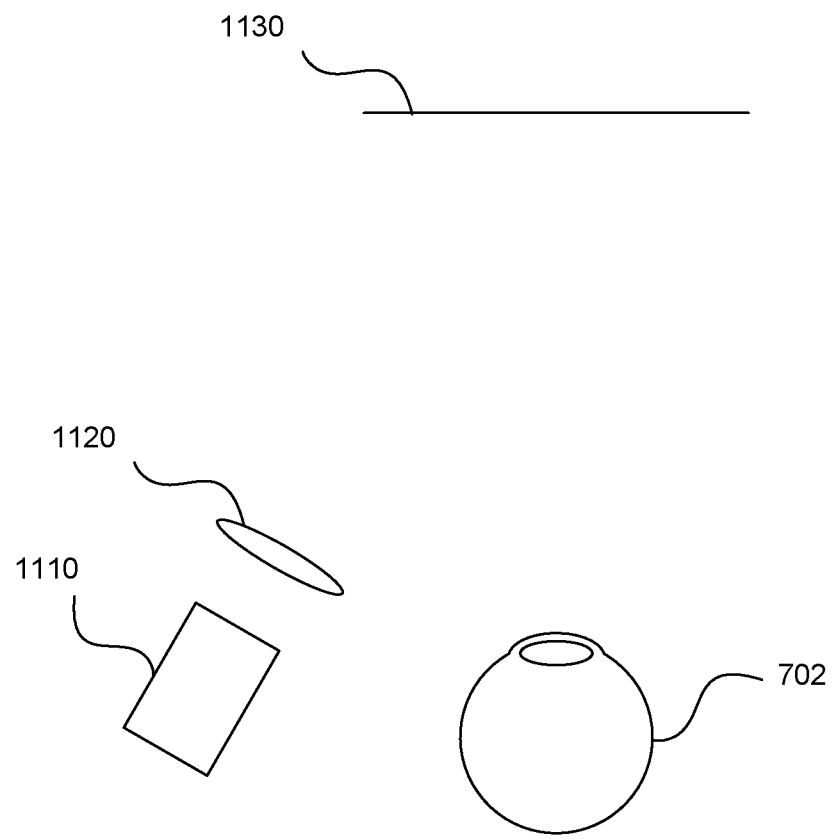
FIG. 11 illustrates a stabilization system that utilizes optical components to stabilize the image in retina space, in accordance with some embodiments.

FIG. 11 illustrates a stabilization system that utilizes optical components 1120 to stabilize the image in retina space, in accordance with some embodiments. In many of the embodiments discussed above, the display 210 is implemented utilizing a conventional LCD or OLED display panel placed in front of the user's eye. In such embodiments, the stabilization actuators 220 can be attached directly or indirectly to the display panel to re-position the display panel relative to the eye 702. However, in other embodiments such as embodiments that implement the display 210 as a projector, the stabilization actuators 220 can be attached to optical components that redirect light from the display 210 towards a projection surface 1130 or the eye 702 rather than re-positioning the display panel directly.

As depicted in FIG. 11, a projector 1110 can include a light source that is projected through an image producing apparatus such as a panel of LCD elements. The light passing through the panel of LCD elements passes through one or more optical components 1120, such as a lens, prism, mirrors, or any combination of the aforementioned components. The image is projected onto a projection surface 1130, where the image is visible to the eye 702 of the user. Alternatively, the light from the projector 1110 may be directed at the user's retina by the optical components 1120 without being reflected off the projection surface 1130.

It will be appreciated that the stabilization of the image in the retina space of the user can be accomplished by adjusting the position and/or orientation of the optical components 1120 relative to the projector 1110 and/or the projection surface 1130 rather than adjusting the position and/or orientation of the panel of LCD elements within the projector 1110. For example, piezoelectric actuators can be attached to a lens or mirror to rotate the lens or mirror around an x-axis and a y-axis to change the position of the projected image on the projection surface 1130. One advantage of this type of system is that the weight of the optical component 1120 can be less than the weight of the display panel and, therefore, the response of the system can be improved by using optical components 1120 to adjust the position of the image in the retina space.

Figure 12A:
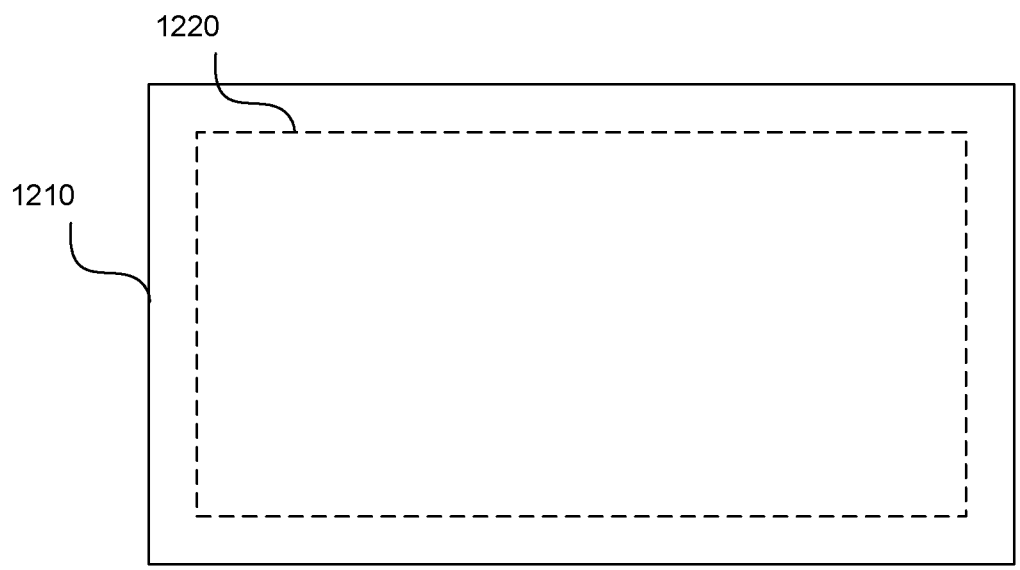
FIGS. 12A & 12B illustrate a combination of virtual image stabilization and physical image stabilization, in accordance with some embodiments.
Figure 12B:
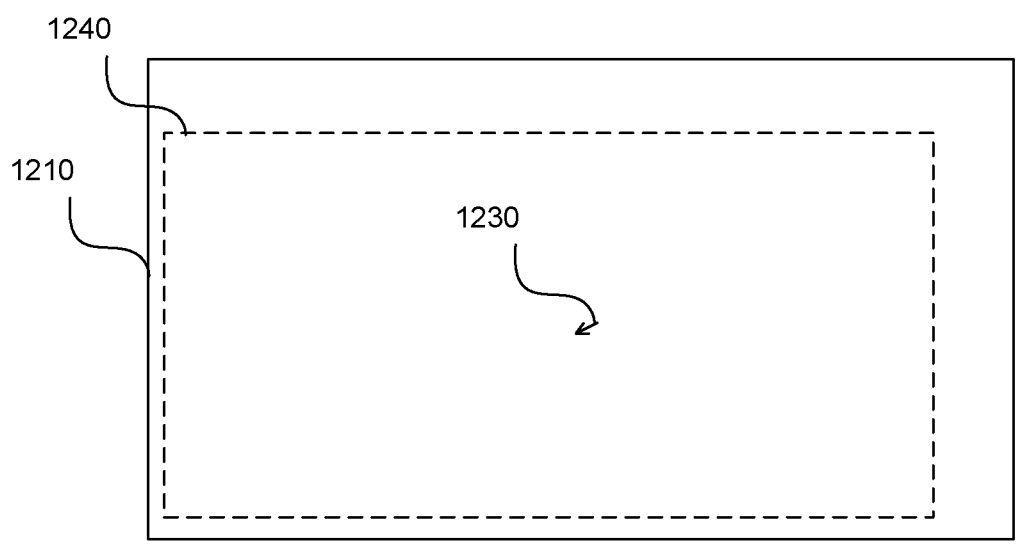

FIGS. 12A & 12B illustrate a combination of virtual image stabilization and physical image stabilization, in accordance with some embodiments. As discussed above, the range of the stabilization actuators can be limited by the arrangement of the physical components of the display. Consequently, the amount of travel that is permitted to align the display with the retina space is also limited. In some embodiments, this range can be extended by combining virtual image stabilization techniques with physical image stabilization techniques.

Virtual image stabilization refers to shifting the rendered image in the pixel space of the display. In other words, a full frame image is typically rendered and scanned out to the display to fill the entire extent of the display. However, the rendered image could be shifted on the physical pixels of the display in a horizontal direction by generating the video signals using an offset for each scanline, skipping a number of pixels at the start of each scanline or padding the start of each scanline with a number of pixels having a black color or the same color as the first pixel in the scanline. In addition, the rendered image could be shifted on the physical pixels of the display in a vertical direction by generating adding blank scanlines to the top of the image or skipping a number of scanlines at the top of the image. It will be appreciated that these techniques can be used to shift the image by a number of pixels in the horizontal and vertical direction.

In some embodiments, the virtual image stabilization can be used to shift the image by a number of pixels at the start of the illumination period. For example, a difference in position of the display, in the retina space, is calculated at the start of the illumination period, such as time $t_1$ compared to time $t_0$ for frame F1 in FIG. 10. This difference is then translated into a shift vector and the video signals for the frame are generated by scanning out pixel values from the frame buffer according to the shift vector. The virtual image stabilization can only compensate for discrete shift positions corresponding to an integer number of pixel widths. Consequently, the virtual image stabilization can only account for the portion of the shift vector that is a multiple of the pixel width. Any additional sub-pixel sized compensation is then performed by adjusting the position of the display using the stabilization actuators.

It will also be appreciated that the virtual image stabilization can only account for a change in position of the display in the retina space from the start of the rendering pipeline to the start of the illumination period. Any additional motion of the display during the illumination period cannot be corrected using this virtual image stabilization technique because it would take too long to update the pixels and illuminate the shifted image at a new location in the pixel space. Consequently, the physical image stabilization technique using the stabilization actuators continues to update the position of the display during the illumination period, such as between time $t_1$ and time $t_2$ for frame F1 in FIG. 10.

In some embodiments, shifting the image frame by even a small number of pixels can be noticeable as some pixels move off the display and the opposite side of the display is replaced with a black stripe. Consequently, one technique for hiding the virtual image stabilization is to render the image frame with a buffer zone of extra pixels. For example, where the display has a native resolution of 1080 pixels×1920 pixels, the rendering algorithm can render each frame to have 1100 pixels×1940 pixels, adding a buffer zone having a pixel width of 10 pixels. It will be appreciated that the width of the buffer zone can limit the magnitude of the shift vector and, therefore, the rendering algorithm can be adapted to increase or decrease the size of the buffer zone as needed. Increasing the size of the buffer zone has a cost associated therewith as the rendering time is increased as more pixel values are generated by, e.g., the fragment shader. For example, increasing the size of the buffer zone increases the size of the frame buffer required to store the image frame in a memory and increases the rendering time to render the image frame as more pixel values need to be calculated by the rendering pipeline. Consequently, in some embodiments, the size of the buffer zone can be limited to be less than a maximum size, such as 100 pixels or a percentage of the resolution of the native resolution of the display.

In some embodiments, the width of the buffer zone in the current frame is determined from the size of the shift vector calculated from a previous frame. For example, if the magnitude of the shift vector is greater than the width of the buffer zone in the previous frame, then the buffer zone can be increased for the current frame. Similarly, if the magnitude of the shift vector is less than a certain percentage of the width of the buffer zone in the previous frame (e.g., 50%), then the buffer zone can be decreased for the current frame. In other words, the size of the buffer zone is adapted based on the magnitude of the motion detected by the stabilization system.

As depicted in FIG. 12A, the rendering pipeline can be configured to render an image frame 1210 at a particular resolution. The resolution of the image frame 1210 can be larger than the resolution of the display. With zero virtual image stabilization, the rendering pipeline is configured to generate video signals for the display based on a portion of the image frame 1220 at the center of the image frame 1210, excluding pixel values within a buffer zone near the edge of the image frame 1210.

In contrast, as depicted in FIG. 12B, the rendering pipeline can be configured to implement virtual image stabilization by calculating a shift vector 1230 after the rendering pipeline has generated the frame buffer for the image frame 1210. The shift vector is translated into an offset value, in horizontal and vertical directions, equal to a number of pixels that is utilized to adjust the scan out of the pixel values in the frame buffer, thereby generating video signals for the display based on a shifted portion of the image frame 1240. Again, the magnitude of the shift vector 1230 can be limited to be less than or equal to the width of the buffer zone.

It will be appreciated that combining virtual image stabilization at a rate of once per frame cycle, combined with physical image stabilization that is performed in real-time during the illumination period can improve the ability of the display stabilization system to stabilize the image in the retina space of the user by reducing the magnitude of the required displacement that needs to be performed by the stabilization actuators at the start of the illumination period.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system comprising:
a display configured to illuminate an image; one or more sensors; and
at least one stabilization actuator configured to stabilize the image in a retina space associated with a user, wherein the at least one stabilization actuator is:
coupled to a display panel included in the display and configured to shift the display panel to stabilize the image in the retina space, or
coupled to an optical component positioned in a path of the image and configured to stabilize the image in the retina space by moving the optical component to adjust the path of the image, wherein:
a rendering pipeline is configured to generate the image for display based on a first sample of the one or more sensors at a first time,
the display is updated to illuminate the image at a second time, subsequent to the first time, and
the at least one stabilization actuator is activated to stabilize the image in the retina space based on a difference between a second sample of the one or more sensors at the second time and the first sample of the one or more sensors at the first time.

2. The system of claim 1, wherein the one or more sensors are configured to detect a head position of the user, and wherein the head position is utilized to define the retina space of the user.

3. The system of claim 2, wherein the one or more sensors include at least one of an inertial measurement unit, a fiducial measurement unit, an optical sensor, or a depth sensor.

4. The system of claim 1, wherein the one or more sensors are configured to detect an orientation of a retina of the user, and wherein the orientation of the retina is utilized to define the retina space.

5. The system of claim 4, wherein the display includes the display panel that is attached, via the at least one stabilization actuator, to a frame that is fixed in a world space.

6. The system of claim 1, wherein the one or more sensors include: an inertial measurement unit configured to detect a head position of the user; and a gaze tracking system configured to detect an orientation of a retina of the user, wherein the head position and the orientation of the retina are utilized to define the retina space.

7. The system of claim 6, wherein the display is included in a head-mounted display unit that is fixed relative to the head position of the user.

8. The system of claim 1, wherein the at least one stabilization actuator is activated to stabilize the image in the retina space during an illumination period.

9. The system of claim 8, wherein the illumination period is less than a time between two subsequent frames illuminated on the display.

10. The system of claim 9, wherein the at least one stabilization actuator returns the display to a home position during an off period when a backlight of the display is deactivated.

11. The system of claim 8, wherein the illumination period for a first portion of the display is offset from the illumination period for a second portion of the display.

12. A method for stabilizing an image in a retina space of a user, the method comprising:
detecting, via one or more sensors, characteristics of the user at a first time; receiving an image from a rendering pipeline, wherein the image is rendered based on a first sample of the characteristics at the first time;
illuminating the image by a display at a second time, subsequent to the first time;
detecting a second sample of the characteristics of the user at the second time;
and controlling at least one stabilization actuator to stabilize the image in the retina space based on a difference between the characteristics of the user detected at the first time and the characteristics of the user detected at the second time, wherein the at least one stabilization actuator is:
coupled to a display panel of pixel elements included in the display and configured to shift the display panel to stabilize the image in the retina space, or
coupled to an optical component positioned in a path of the image and configured to stabilize the image in the retina space by moving the optical component to adjust the path of the image.

13. The method of claim 12, wherein the characteristics of the user include a head position of the user.

14. The method of claim 12, wherein the characteristics of the user include an orientation of a retina of the user.

15. The method of claim 14, wherein the at least one stabilization actuator is configured to move the display panel of pixel elements relative to a frame of the display.

16. The method of claim 14, wherein the at least one stabilization actuator is configured to move the optical component positioned to redirect light from the display towards the user.

17. A head-mounted display unit comprising:
a display panel including a left portion and a right portion, wherein the left portion is configured to illuminate a left eye image of a stereoscopic image pair and the right portion is configured to illuminate a right eye image of the stereoscopic image pair; and
a first stabilization actuator coupled to the left portion of the display panel; and
a second stabilization actuator coupled to the right portion of the display panel,
wherein left portion of the display panel can be repositioned independently from the right portion of the display panel, and
wherein the left eve image is stabilized according to a left eve retina space that is defined based on an orientation of a left retina of the user and the right eve Image is stabilized according to a right eve retina space that is defined based on an orientation of a right retina of the user.

18. The head-mounted display unit of claim 17 further comprising:
an inertial measurement unit configured to detect a head position of the user; and
a gaze tracking system configured to detect the orientation of the left retina of the user and the orientation of the right retina of the user.

* * * * *